United States Patent [19]
Williamson

[11] Patent Number: 6,146,600
[45] Date of Patent: Nov. 14, 2000

[54] SIDE BODY DISINGESTATION CHAMBER

[75] Inventor: Michael Ronald Williamson, Honolulu, Hi.

[73] Assignee: University of Hawaii, Honolulu, Hi.

[21] Appl. No.: 09/225,743

[22] Filed: Jan. 4, 1999

Related U.S. Application Data

[63] Continuation-in-part of application No. 09/022,711, Feb. 12, 1998, which is a continuation of application No. 08/825,408, Mar. 27, 1997, Pat. No. 5,792,419, which is a continuation of application No. 08/589,586, Jan. 22, 1996, abandoned, which is a continuation of application No. 08/123,519, Sep. 17, 1993, abandoned.

[51] Int. Cl.$^7$ ..................................................... G05B 1/00
[52] U.S. Cl. ........................... 422/307; 108/51.1; 43/124; 422/1
[58] Field of Search ................................. 422/307, 308, 422/105, 108, 109, 1; 426/419, 407, 521; 43/124; 99/474, 477, 483; 108/51.1, 51.4, 902

[56] References Cited

U.S. PATENT DOCUMENTS

| | | | |
|---|---|---|---|
| H828 | 10/1990 | Armstrong et al. | 426/615 |
| 969,969 | 9/1910 | Merrell . | |
| 2,095,455 | 10/1937 | Simonson | 99/271 |
| 2,978,333 | 4/1961 | Teigen . | |
| 3,518,949 | 7/1970 | Stock | 107/7 |
| 3,986,832 | 10/1976 | Smorenburg | 21/80 |
| 4,152,842 | 5/1979 | Laughlin | 34/196 |
| 4,196,225 | 4/1980 | Mencacci | 426/523 |
| 4,201,916 | 5/1980 | Ellner | 250/372 |
| 4,336,456 | 6/1982 | Kuse et al. | 250/436 |
| 4,421,987 | 12/1983 | Herold | 250/492.1 |
| 4,457,292 | 7/1984 | Jorgensen et al. | 126/21 |
| 4,503,333 | 3/1985 | Kulin et al. | 250/455.1 |
| 4,535,247 | 8/1985 | Kurtz | 250/436 |
| 4,572,427 | 2/1986 | Selfridge et al. | 236/3 |
| 4,618,497 | 10/1986 | Couey et al. | 426/233 |
| 4,621,195 | 11/1986 | Larsson | 250/438 |
| 4,676,152 | 6/1987 | Tsuji et al. | 99/468 |
| 4,689,303 | 8/1987 | Kraft et al. | 435/290 |
| 4,824,685 | 4/1989 | Bianco | 426/418 |
| 5,041,298 | 8/1991 | Wallace et al. | 426/418 |
| 5,203,108 | 4/1993 | Washburn, Jr. | 43/430 |
| 5,312,034 | 5/1994 | Nakagawa et al. | 229/120 |

OTHER PUBLICATIONS

Couey and Hayes, "Quarantine Procedure for Hawaiian Papaya Using Fruit Selection and a Two–stage Hot–water Immersion", *Journal of Economic Entomology* 79:1307–1314 (1986).

(List continued on next page.)

*Primary Examiner*—Krisanne Thornton
*Attorney, Agent, or Firm*—Medlen & Carroll, LLP

[57] ABSTRACT

A disinfestation treatment chamber for treating fruit, flower and vegetable commodities subject to infestation by quarantine pests. The commodities are disinfested so as to meet quarantine restrictions without adversely affecting the quality of the commodity. The commodity is loaded into the treatment chamber in bins onto a low friction conveyor track system which transports the bins from one end of the chamber to the other. The commodities are treated while they are inside of the treatment chamber.

7 Claims, 26 Drawing Sheets

OTHER PUBLICATIONS

APHIS, Plant Protection and Quarantine Treatment Manual, Section III, Part 9, Treatment Procedure (1985).

APHIS, CFR Amendment No. 85–19, Part 318—Hawaiian and Territorial Quarantine Notices (1992).

Cavaletto, "Quality of High–Temperature Forced–Air Treated Papayas", Proceedings: 25th Annual Hawaii Papaya Industry Association Conference, pp. 10–15, Sep. 29–30 (1989).

Cavaletto, "Quality Evaluation of High–Temperature Forced–Air Treated Papayas", Proceedings: 26th Annual Hawaii Papaya Industry Association Conference, pp. 10–12, Sep. 28–29 (1990).

Armstrong et al., High–Temperature, Forced–Air Quarantine Treatment for Papayas Infested with Tephritid Fruit Flies (Diptera: Tephritidae), *J. Econ. Entomol.* 82(6):1667–74 (1989).

Armstrong, "High Temperature Forced–Air Quarantine Treatment for Papayas," Proceedings: 23rd Annual Hawaii Papaya Industry Ass'n Conference, pp. 17–20, Sep. 25–26 (1987).

Armstrong, "High Temperature Forced–Air Quarantine Treatments for Fresh Fruits Infested by Tephritid Fruit Flies," *Acta Horticulturae* 269:449–51 (1990).

Williamson and Winkleman, "Commercial Scale Heat Treatment For Disinfestation of Papaya," ASAE Paper No. 89–6054 (1989).

Winkleman and Williamson, "Advances in Commercial Dry Heat Disinfestation of Papaya," ASAE Paper No. 90–6016 (1990).

Williamson et al., "Certification of Fruit Fly Disinfestation Chambers," ASAE Paper No. 91–6569 (1991).

Sharp et al, "Hot–Air Treatment Device for Quarantine Research," *J. Econ. Entomol.* 84(2):520–27 (1991).

Gaffney, "Warm Air/Vapor Heat ResearchFacility for Heating Fruits for Insect Quarantine Treatments," ASAE Paper No. 90–6615 (1990).

Gaffney and Armstrong, "High–Temperature Forced–Air Research Facility for Heating Fruits for Insect Quarantine Treatments," *J. Econ. Entomol.* 83(5):1959–64 (1990).

Gaffney, "Engineering Considerations of Heat Transfer in Quarantine Treatments for Fruit," ARS Quantitative Workshop (Nov. 1989).

Gaffney et al., "Vapor Heat Research Unit for Insect Treatments," *J. Econ. Entomol.* 83(5):1965–71 (1990).

Gaffney, "Engineering Principles Related to the Design of Systems for Air Cooling of Fruits and Vegetables in Shipping Containers," Proceedings, 29th Int'l Conference on Handling Perishable Agricultural Commodities, Michigan State University (Sep. 1977).

Bennett et al., "A Prototype Commercial Forced–Air Precooler," ARS 52–9 (Dec. 1965).

Hood, "A Forced–Air Precooler for Pickling Cucumbers," *Food Technology* 21(2):86–88 (1967).

Baird et al., "Research Facility for Forced–Air Precooling of Fruit and Vegetables," *Trans. of the ASAE* 18(2):376–79 (1975).

Morey and Long, "Research System for Field Cooling of Fresh Produce," *Applied Engineering in Agriculture* 4(3):259–64 (1988).

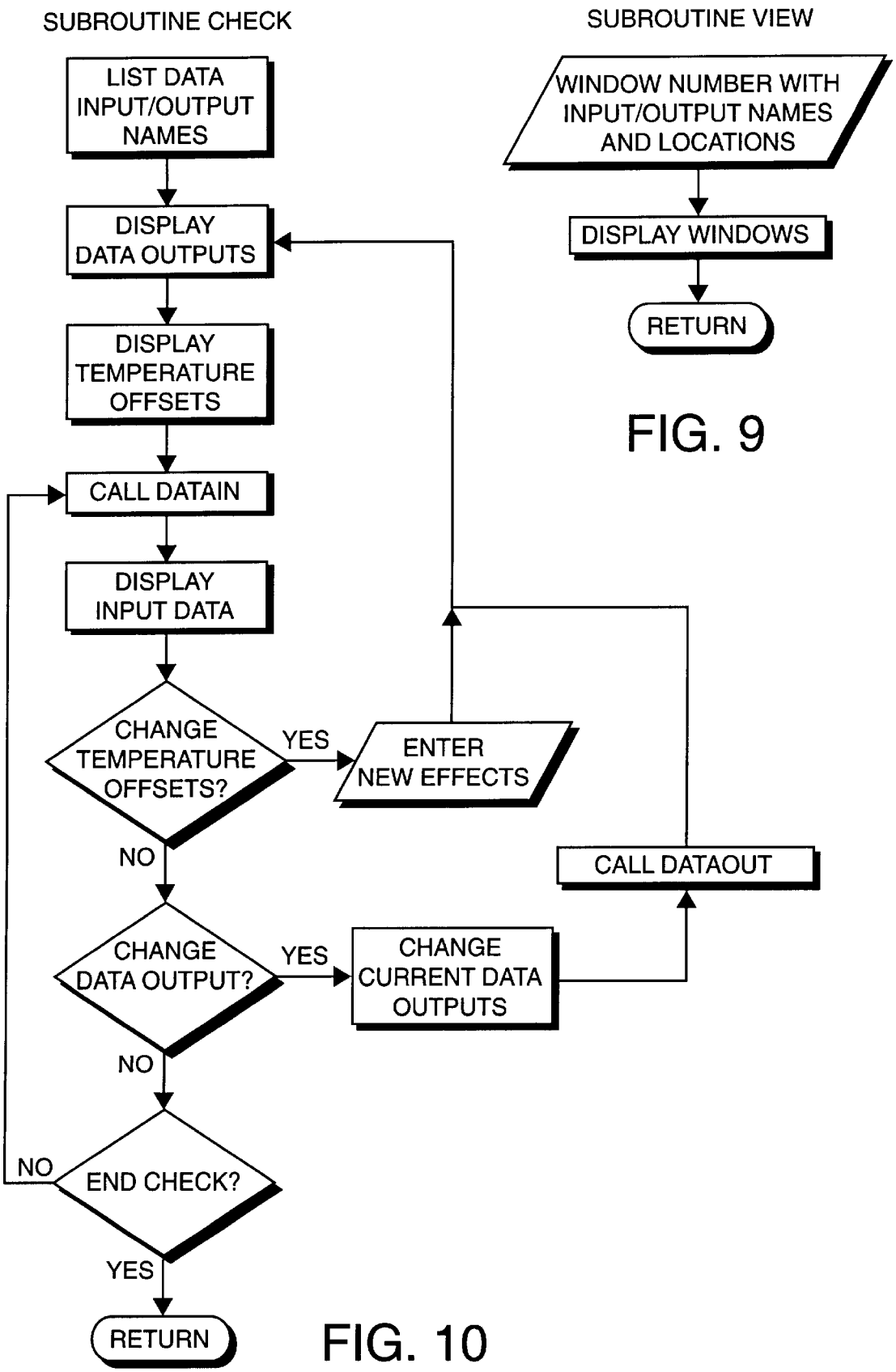

TRACK SUPPORT DETAIL
WELD SUPPORT GUSSETE
OD 24" CENTER BELOW
SQURE TUBE SECTION

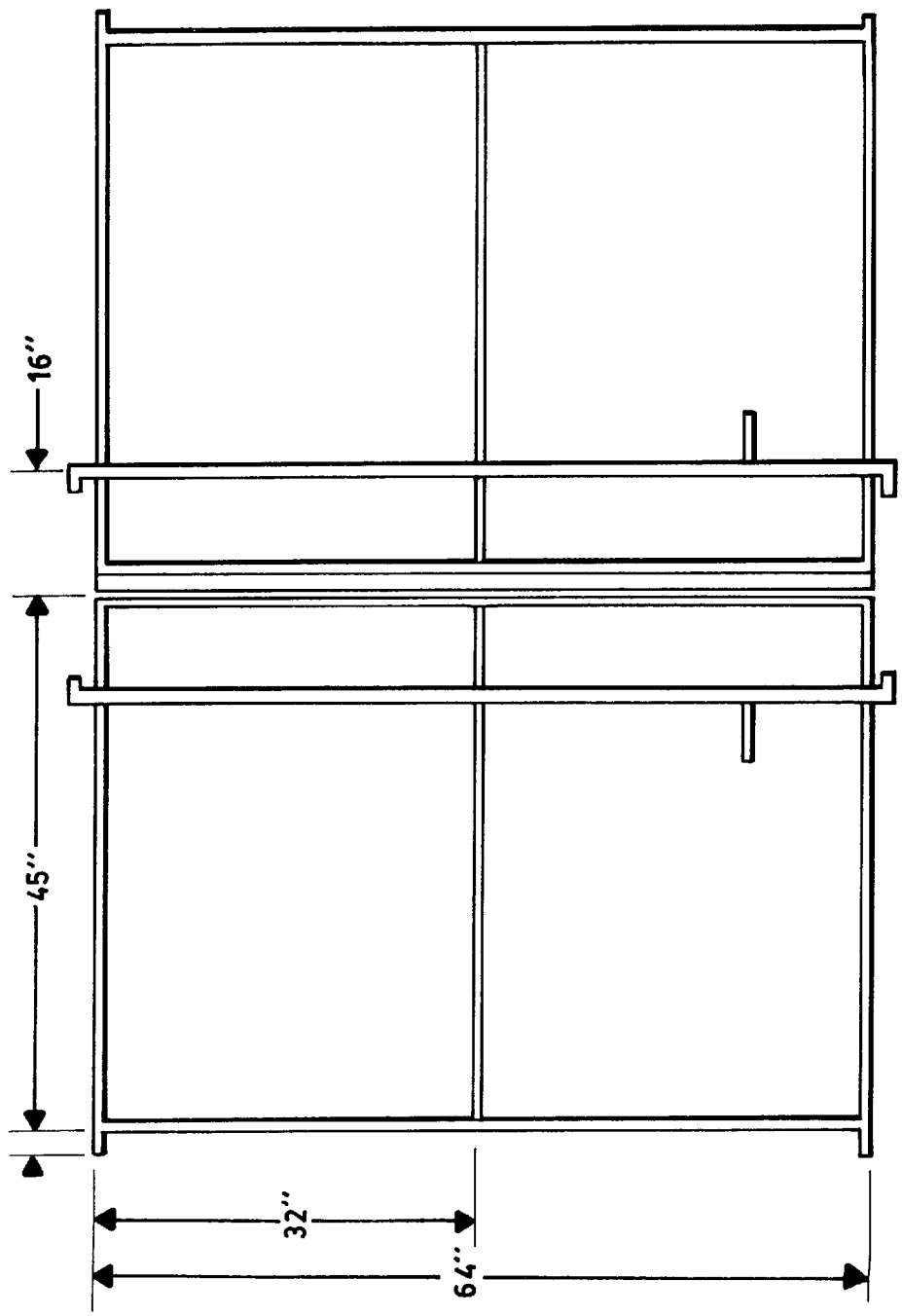

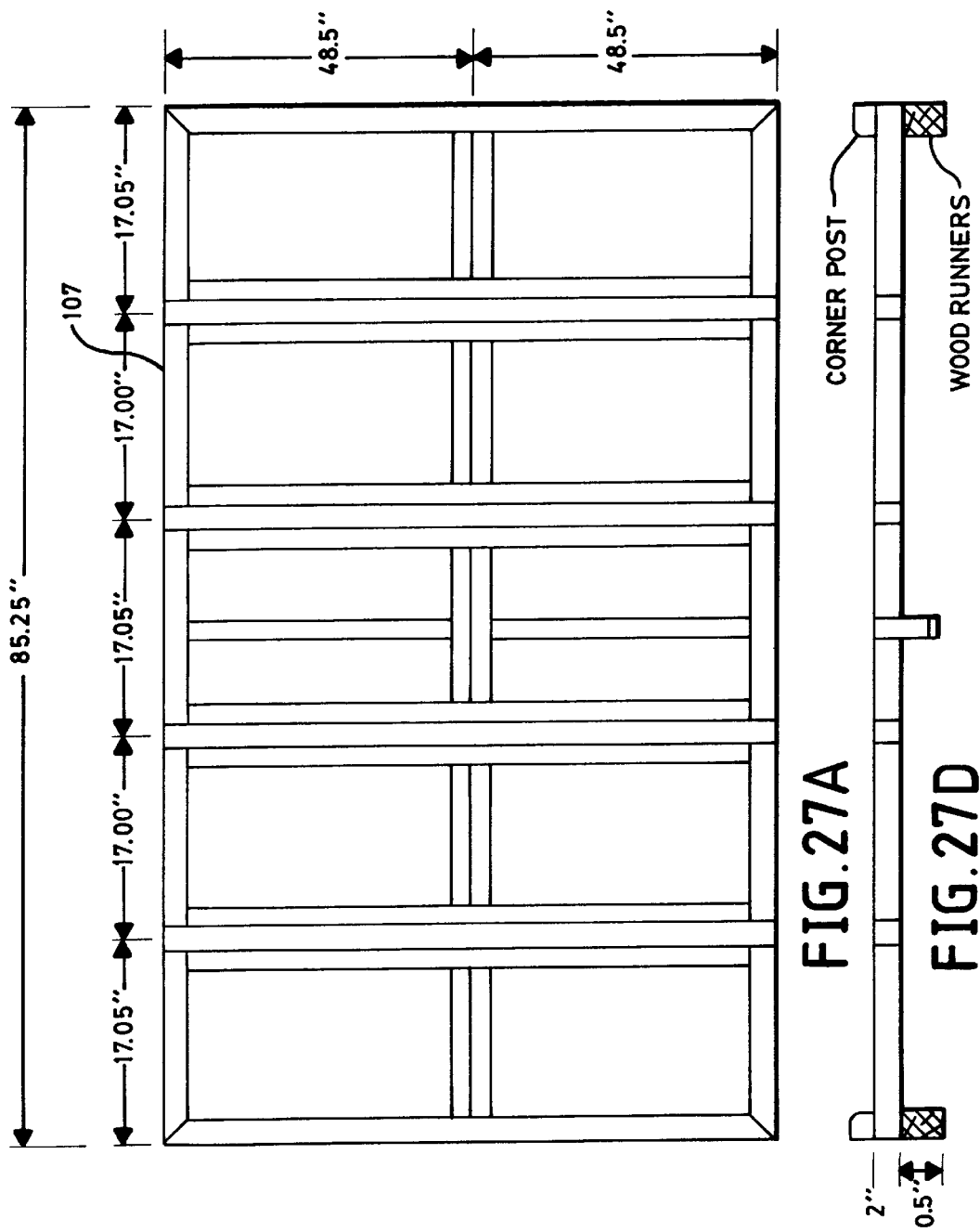

SIDE BODY DISINGESTATION CHAMBER

The present application is a continuation-in-part application of pending U.S. patent application Ser. No. 09/022,711, filed Feb. 12, 1998, which is a continuation application of U.S. patent Ser. No. 08/825,408, filed Mar. 27, 1997, now issued U.S. Pat. No. 5,792,419, which is a continuation application of U.S. patent Ser. No. 08/589,586, filed Jan. 22, 1996, now abandoned, which is a continuation application of U.S. patent Ser. No. 08/123,519, filed Sep. 17, 1993, now abandoned.

FIELD OF THE INVENTION

This invention relates to a postharvest disinfestation treatment chamber which is used to ensure that commodities such as fruits, flowers and vegetables are free of pests so as to meet quarantine requirements. More particularly, the present invention relates to heating the commodities with hot air under controlled conditions of relative humidity to kill all life stages of quarantine pests present in the commodity without adversely affecting the quality of the commodity.

BACKGROUND OF THE INVENTION

Certain pests are very destructive to agricultural commodities; thus quarantine restrictions are imposed to ensure that these pests are not disseminated by export of agricultural commodities which may harbor these pests to areas where the pests do not occur. Illustrative of such quarantine pests are tephritid fruit flies (Diptera: Tephritidae) such as the Mediterranean fruit fly, Ceratitis capitata (Wiedemann); the oriental fruit fly, Dacus dorsalis Hendel, and the melon fly, Dacus cucurbitae Coquillet. Fruit flies are among the most destructive insect pests of citrus, deciduous fruits, and vegetables. Tephritid fruit flies are present in Hawaii and have been shown to spread as larvae or eggs in fruits or vegetables shipped from infested areas. Agricultural commodities such as papayas, mangos, avocados, citrus, cucumbers, and bell peppers produced in Hawaii that may be infested with fruit flies cannot be shipped to the mainland U.S. or Japanese markets without quarantine treatment to ensure that the fruits or vegetables are free of fruit flies.

Prior to September, 1984, the standard treatment for papayas was fumigation with ethylene dibromide (EDB). Subsequent to the cancellation by the U.S. Environmental Protection Agency of the use of EDB as a food fumigant, the quarantine treatment that was adopted consisted of selecting papaya fruit of no more than quarter-ripeness as defined by color standard values measured with a calorimeter and then immersing the fruit in water at 42 degree(s) C. for 30 minutes followed immediately by a second immersion in water at 49 degree(s) C. for 20 minutes (Couey and Hayes, Journal of Economic Entomology, 79:1307–1314 (1986)). The hot-water immersions are used to destroy the fruit fly eggs and control postharvest decay. However, the complete treatment is limited because of the ripeness selection and because the water immersions are not sufficiently hot to kill fruit fly larvae inside the fruit. This treatment was deregistered as an approved method of quarantine treatment for papayas in 1991.

Another quarantine procedure, called the "vapor heat treatment", uses high-temperature water-saturated vapor to raise the pulp temperature of papaya to 44.4 degrees C. over a 6 to 8 hour period. The fruits are held at the temperature for 8.75 hours, then cooled immediately after the heating phase to below ambient temperature (APHIS, Plant Protection and Quarantine Treatment Manual, Section III, Part 9, Treatment Procedure, 1985). Although this procedure is effective against all fruit fly life stages, the treatment is time consuming and expensive. Also, scalding damage to the fruit may occur. A modified version of the vapor heat treatment, the "quick run-up treatment", requires heating papayas with saturated water vapor until the fruit center temperature reaches 47.2 degree(s) C., then immediately cooling the fruits (APHIS, CFR Amendment No. 85-19, Part 318— Hawaiian and Territorial Quarantine Notices). Although this method takes less time, elaborate facilities are still needed and some fruits may be damaged by vapor heat.

Another method of treating fruit for these infestations comprises heating a fruit or vegetable commodity in hot air under controlled conditions of relative humidity until the temperature of the commodity exceeds the thermal death point temperature of the pest but does not adversely affect the quality of the commodity. The commodity is held at this temperature until the pest is killed. Then, the commodity is cooled. This disinfestation treatment provides a replacement method to the prior art methods that use hot water or saturated water vapor and which have the disadvantages outlined above.

Using the hot air method, fruit and vegetable commodities subject to infestation by quarantine pests are disinfested so as to meet quarantine restrictions without adversely affecting the quality of the commodity. The method involves heating the commodity in hot air having a relative humidity of 30–80 percent until the temperature of the commodity exceeds the thermal death point temperature of the target pest, but is not so high as to adversely affect commodity quality. The temperature is held at this temperature until the pest is killed. The method is effective against all life stages of quarantine pests and is suitable for large-scale commercial disinfestation of commodities for movement through marketing channels, for example, for disinfestation of papayas of tephritid fruit flies such as the Mediterranean fruit fly, the melon fly and the oriental fruit fly.

Under controlled conditions this method does not adversely affect fruit and vegetable quality such as odor, taste, appearance, ripening, texture, shelf-life or other marketable traits of the commodity. Major agricultural commodities which can be treated by this method include, but are not limited to, fruits and vegetables such as papaya, mango, starfruit (carambola), atemoya, lychee, eggplant, green peppers, sweet peppers, hot peppers, cucumbers, avocado and squash.

Disinfestation chambers have been built which employ the different methods described above for killing various pests in different fruits and vegetables. One common chamber in use currently includes a fan, typically centrifugal, housed in its own chamber, separate from the commodity chamber. Such a chamber was taught by Tsuji et al. in U.S. Pat. No. 4,676,152. In the Tsuji chamber air is drawn in, heated by a heat exchanger, and then blown into the commodity chamber. Uniform airflow in such a chamber has proven difficult to maintain. The airflow can be reversed by the use of flow dampers. However, such dampers serve to further disrupt the airflow. The external positioning of the fan relative to the chamber creates heat and air flow losses, as well as temperature variations at different locations within the chamber.

Another known method employs horizontal airflow through the chamber. In this type of chamber the fans or ducts are mounted on the side of the chamber and blow the air across the chamber horizontally. Horizontal airflow is not conducive to successfully treating commodities stored in bins.

SUMMARY OF THE INVENTION

A pest disinfestation chamber used to disinfest commodities before they are exported for resale, the commodities transported in bins, after harvest, the chamber comprising a conveyor track system for transporting bins of fruit or vegetables from a first end of the chamber to a second end of the chamber, the conveyor track system coupled to the chamber; and a means for heating and circulating air within the chamber and through the bins of commodities, the means for heating and circulating air coupled to the chamber and positioned inside of the chamber and under the bins of commodities. The conveyor track system includes a low friction track for transporting bins of fruit or vegetables from the first end of the chamber to a second end of the chamber. The bins are loaded onto the conveyor track system through a first set of end doors and unloaded off of the conveyor track system through a second set of end doors, the first and the second set of end doors providing a seal against the ends of the bins during treatment of the commodities. The second set of end doors opening into an insect-free zone. The means for heating and circulating air is comprised of an axial fan and heat exchanger. The means for heating and circulating air is comprised of a reversible fan and heat exchanger.

A treatment method for disinfesting a fruit, flower or vegetable commodity of a quarantine pest, which comprises the steps of: loading a plurality of bins, each bin full of a fruit, flower or vegetable commodity, into an interior of a disinfestation treatment chamber onto a low friction conveyor track system; heating the commodity inside of the plurality of bins in one or more stages with air having a temperature above the thermal death point temperature of a target pest, the air heated and circulated by a fan and heat exchanger positioned under the plurality of bins and inside the interior of the disinfestation treatment chamber; holding the commodity inside of the plurality of bins at this temperature until the target pest is killed; and unloading the plurality of bins from the interior of the disinfestation treatment chamber using the conveyor track system. The treatment method further comprises the step of placing a temperature probe within the sampled fruit or commodity located in a cold spot in each stack or bin within the chamber and measuring the temperature of the cold spot to determine the temperature distribution of the chamber.

In one embodiment, the present invention contemplates modifying a shipping container (e.g. a marine shipping container) to create a pest disinfestation system. In one embodiment, the pest disinfestation system for disinfesting fruit or vegetables, comprises: a ) a treatment chamber; b) a pallet of fruit or vegetables, said pallet comprising a metal deformable frame; c) a conveyor track system configured for moving said pallet along the length of said chamber, said conveyor track system comprising first and second frictional sealing tracks, one on each side of the chamber, and a center roller track capable of supporting the center of said pallet, thereby causing deformation of said deformable pallet frame, the conveyor track positioned within said chamber; and d) means for heating and circulating air within the chamber and through said fruit or vegetables, the means for heating and circulating air coupled to the chamber and positioned inside of the chamber and under the bins of fruit or vegetables.

The present invention contemplates a method of treating fruit or vegetables, comprising: a) providing: i) a pallet of fruit or vegetables, said pallet comprising a metal deformable frame; ii) a treatment chamber comprising means for heating and circulating air within the chamber and through said fruit or vegetables, and an internally positioned conveyor track system configured for moving said pallet along the length of said chamber and above said means for heating and circulating air, said conveyor track system comprising first and second frictional sealing tracks, one on each side of the chamber, and a center roller track capable of supporting the center of said pallet; b) introducing said pallet into said treatment chamber under conditions wherein said center roller track causes deformation of said deformable pallet frame; and c) subjecting said fruit or vegetables in said pallet to heated air from said means for heating and circulating air, thereby treating said fruit or vegetables.

The modified shipping container can have a number of designs (including portable, e.g. moveable versions). The present invention contemplates where said chamber further comprises a first set of end doors and a second set of end doors. Moreover, the present invention contemplates an embodiment wherein said means for heating and circulating air comprises a fan and heat exchanger (and more preferably, two fans positioned in the center of the chamber below the material to be treated).

BRIEF DESCRIPTION OF THE DRAWINGS

FIG. 9 illustrates the subroutine flowchart for the subroutine VIEW used to display the input/output names and locations.

FIG. 10 illustrates the subroutine flowchart for the subroutine CHECK used to change the temperature offsets and test the output channels.

FIG. 24A illustrates an embodiment of the end doors for the container of FIG. 16.

FIG. 27A illustrates (in top view) one embodiment of a pallet for use with the container of FIG. 16.

DESCRIPTION OF THE PRESENT INVENTION

The present invention is an improved, non-chemical disinfestation chamber. The chamber is intended to kill insect pests including fruit flies in various tropical commodities, such as papayas. The commodity can be contained in bins or stacked trays or baskets (all hereinafter referred to as commodity bins) which are loaded into the treatment chamber. Heated air is then forced through the commodity mass to raise its internal temperature above that required to kill all stages of the target insect.

The present invention uses a fan/heat exchanger assembly installed within the treatment chamber to circulate heated air through the commodity. Chambers of the prior art have positioned the fan(s) and heat exchanger(s) outside the treatment chamber, a practice which aggravates the problem of poor heat uniformity within the commodity mass and leads to insufficient or excessive heating. By contrast, the device of the present invention positions the fan assembly inside the treatment chamber, directly below the track supporting the commodity bins. This placement is intended to reduce heat losses and to promote uniform temperature distribution within the commodity. Given the narrow window between the temperature required to kill the insect and the temperature which damages the commodity, uniformity is very important to successful commercial operation.

The temperatures required to kill insects will vary depending on the type of insect targeted. The temperature which cannot be exceeded without damaging the commodity also varies depending on the type of commodity to be treated. To illustrate an example of the narrow window that the chamber of the present invention must operate within, the temperature necessary to kill a fruit fly is 47.2° C. and the temperature that cannot be exceeded without damaging a papaya is 48.5° C. Although the temperature at which damage to the commodity occurs, varies according to fruit type, season and weather conditions, papayas are particularly susceptible to heat damage at temperatures above 48.5° C.

The chamber of the present invention has spaces above and below the bins which form the plenums for air flow. The commodity bins rest upon an airtight low friction track as well as against a vertical side of the low friction track forcing the heated air, flowing from the fan, to pass through the commodity mass within the bins before recirculation back to the fan. Other prior art chambers use rollers to support and transport the bins through the chamber. The rollers allow air to leak past the bins and bypass the commodity in the bins. In contrast to the prior art, the low friction track of the present invention prevents air leakage around the bins and thereby controls proper air flow throughout the chamber.

DETAILED DESCRIPTION OF A FIRST PREFERRED EMBODIMENT

Figure 1:
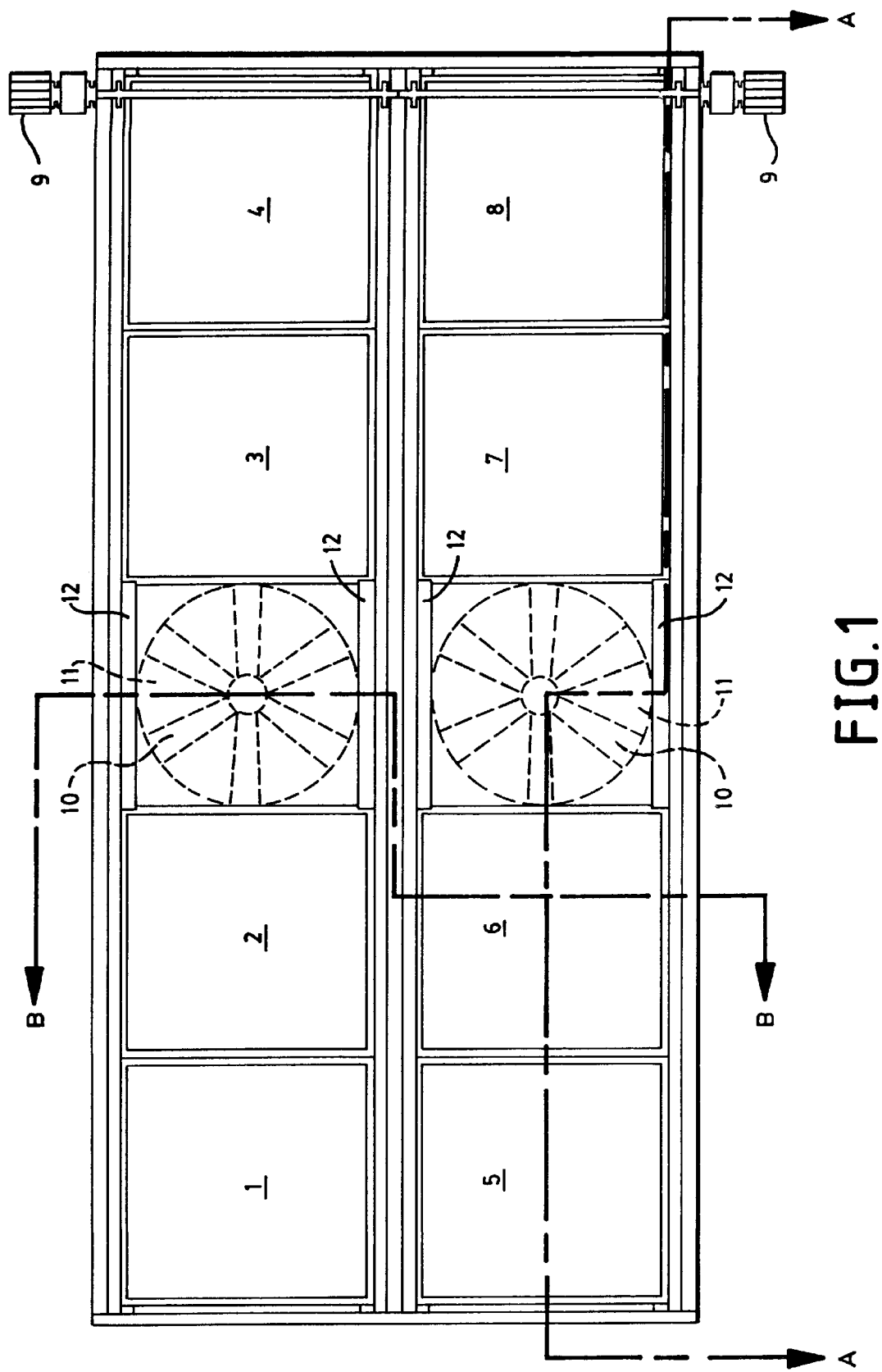
FIG. 1 illustrates a floor plan of the present invention showing the general arrangement of the commodity bins and the fan/heat exchangers on both sides.
Figure 2:
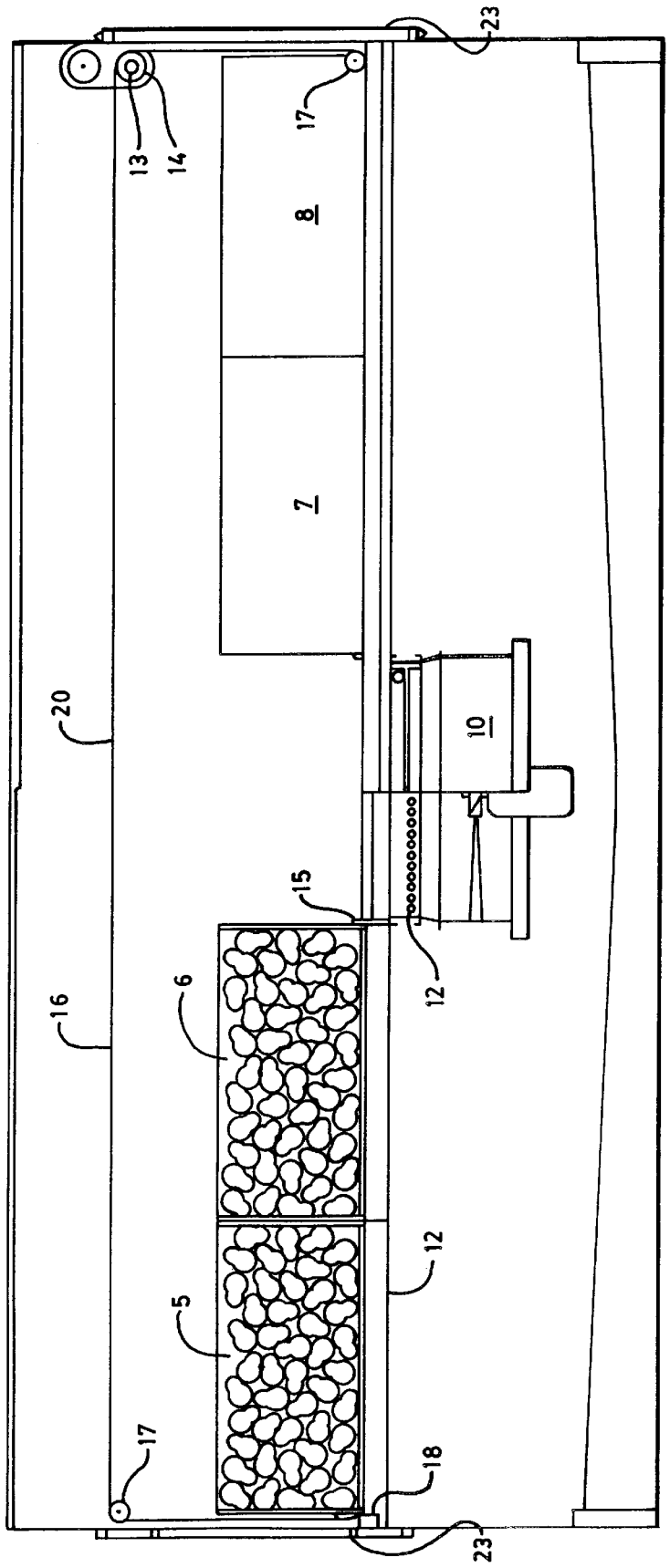
FIG. 2 illustrates a cut away side section of the present invention showing the arrangement of the fan/heat exchanger assembly, commodity bins and the conveyor system.
Figure 3:
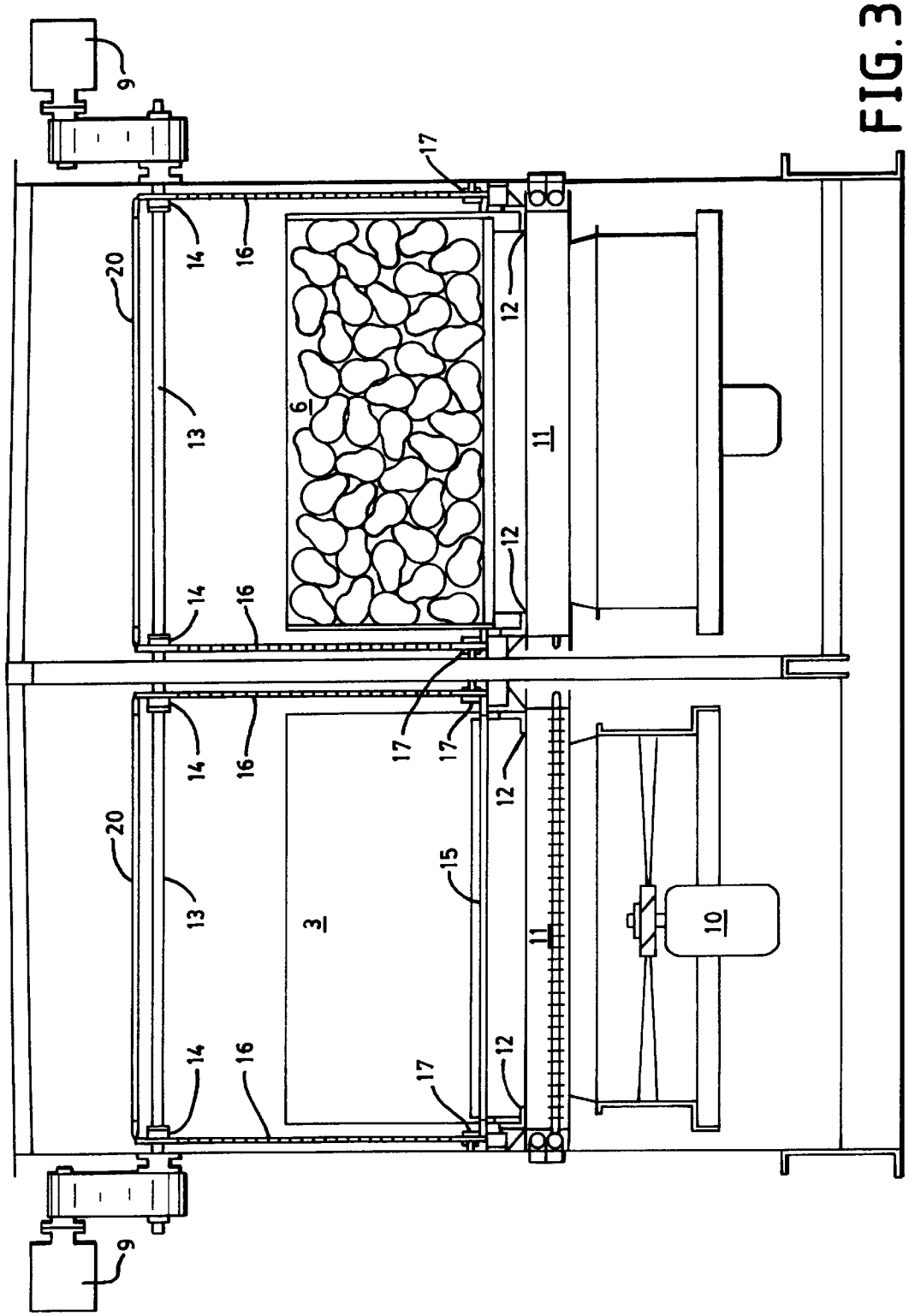
FIG. 3 illustrates a cut away end section of the present invention showing the sealing plates of the conveyor system and the track.

A floor plan of the disinfestation chamber of the present invention is illustrated in FIG. 1, a side section is presented in FIG. 2 and an end section in FIG. 3. The chamber of the present invention includes two identical rows of four commodity bins each. The drawing of FIG. 1 shows the floor plan arrangement of the commodity bins 1 through 8 and the fan/heat exchanger assemblies 10 and 11. The two sides of the treatment chamber are identical and each side has the capacity to hold four commodity bins. Each side has a door 22 and 23 located at each end, opening outward to allow commodity bins to be loaded and unloaded. The commodity bins are loaded into the treatment chamber at one end, positioned by the conveyor system for treatment and, following treatment, unloaded through the door at the opposite end, forming a flow through process in the treatment chamber.

Figure 4:
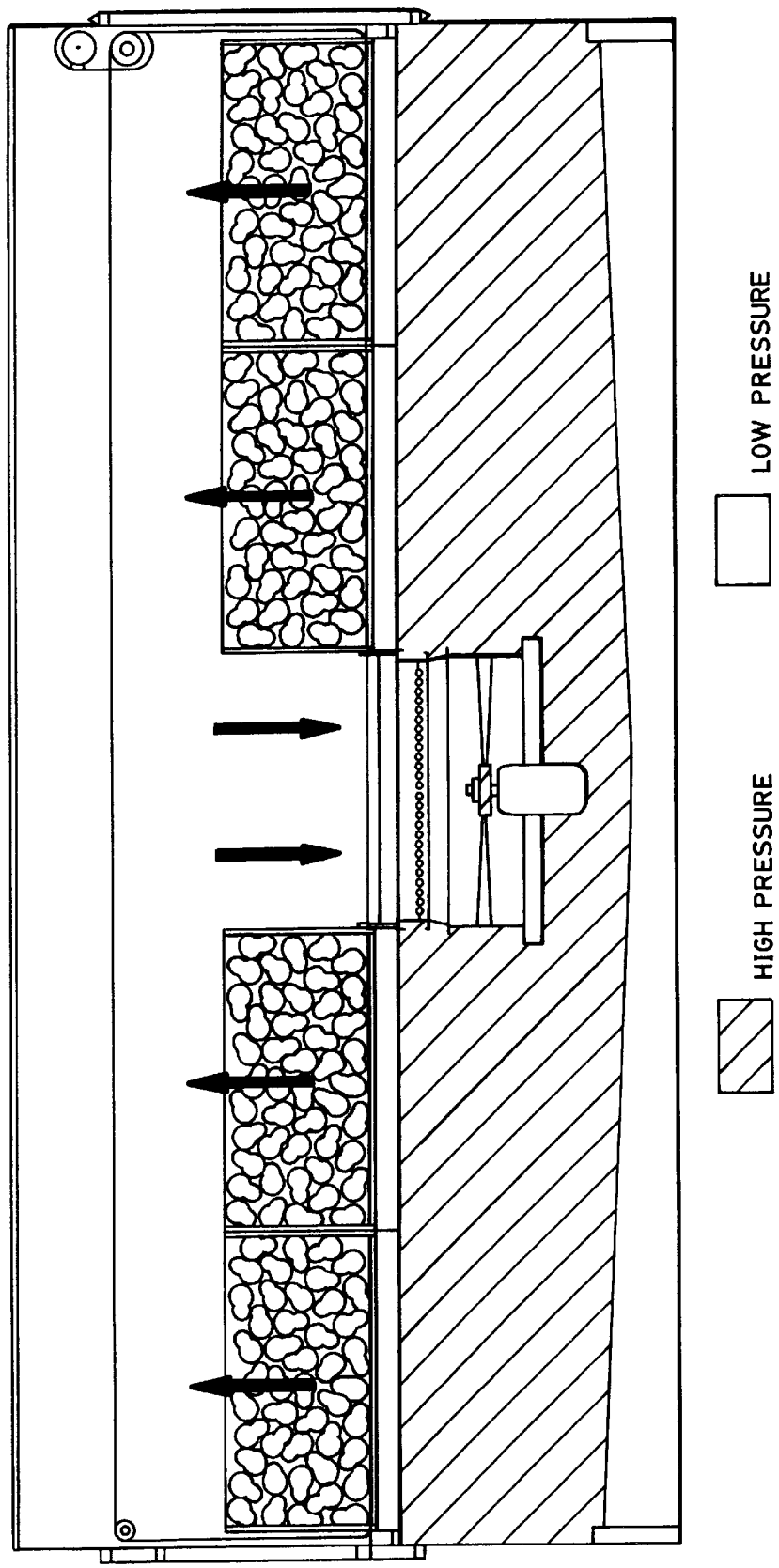
FIG. 4 illustrates the air flow path of the present invention when the high pressure air is in the bottom plenum and the air flows from the bottom of the commodity bins, through the perforated commodity bin floors, through the commodity and exiting from the top.
Figure 5:
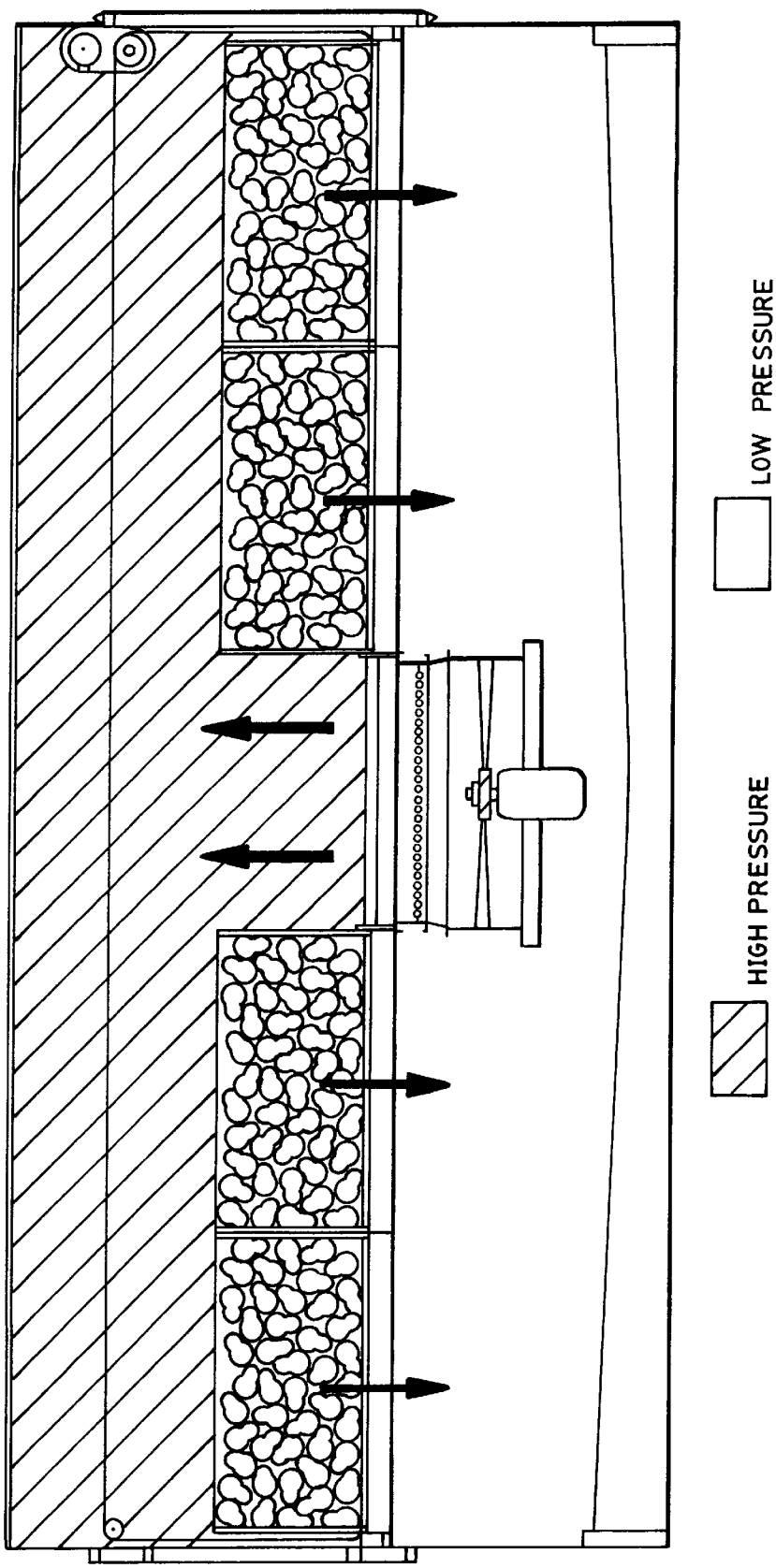
FIG. 5 illustrates the air flow path of the present invention when the high pressure air is in the top plenum and the air flows from the top of the commodity bins, through the commodity, through the perforated commodity bin floors and exiting from the bottom.

The fan 10 forces air through the heat exchanger 11 into one plenum, depending on the fan's direction of rotation, through the commodity into a return plenum and back to the fan. Thus, one plenum has higher air pressure and the other plenum has low air pressure. The commodity forms one path between the upper and lower plenums while the fan/heat exchanger 10 and 11 forms the return path. The air is forced through the commodity due to the difference in air pressure between the two plenums. The fan 10 can be chosen to include the capability to reverse its direction of rotation allowing air to be forced upward through the commodity, as illustrated in FIG. 4, or downward through the commodity, as illustrated in FIG. 5, thus promoting uniform heating within the commodity mass.

The fan/heat exchanger assembly 10 and 11 circulates the air throughout the chamber. The fan/heat exchanger assembly 10 and 11 is placed immediately below the bin track 12 to allow unimpeded loading and unloading of the commodity bins into and out of the treatment chamber. During treatment the space directly above the fan/heat exchanger assembly is not taken up by a commodity bin and forms part of the upper plenum.

The conveyor is utilized for both loading and unloading of the commodity bins. Each chamber side has its own independent conveyor system. The conveyor system is composed of two parallel bin tracks 12 lined with a low-friction material, two chain loops 16, two fan sealing plates 15, a push rod 20, six idler sprockets 17, two drive sprockets 14, a drive shaft 13 and a gear reduction motor 9. Loading the empty chamber is accomplished by positioning the fan sealing plate 15 near the drive shaft 13, loading the commodity bins 8 and 7 on the bin track through the end door 23 and partially pushing the commodity bins 8 and 7 into the chamber using a forklift. The gear reduction motor 9 is activated by pulling a switch and stops automatically when the commodity bin 7, pushed by the fan sealing plate 15, is immediately beyond the fan/heat exchanger assembly 10 and 11. The commodity bins 6 and 5 are subsequently loaded with a forklift. The commodity bin 6 is prevented from being pushed over the fan/heat exchanger assembly 10 and 11 by a second fan sealing plate.

During treatment, the end doors 22 and 23 are closed and sealed and only the air trapped inside the chamber is heated and circulated within the chamber. No air from outside the chamber is pulled into the chamber and no air from within the chamber is released out of the chamber during treatment of the commodity.

After treatment, the commodity bin 8 is unloaded by a forklift through the end door 22. After the commodity bin 8 is unloaded the commodity bin 7 is pushed to the end door 22 by the fan sealing plate 15 where it stops automatically. The commodity bins 6 and 5 are pushed passed the fan/heat exchanger assembly 10 and 11, into a position to be unloaded, using the push rod 20.

In the treatment chambers of the prior art, the commodity bins are loaded onto rollers inside the chamber, and pushed into position by hand or by the forklift or a hydraulic ram successively pushing the bins inward. The commodity bins are unloaded by workers pulling them out by hand or by a forklift using a hook on the end of a piece of rope. The hook must be attached to each bin by a worker who crawls into the chamber. By contrast, in the present invention the commodity bins are also unloaded off of the conveyor track system by a forklift driver who merely has to activate a switch from his driver's seat to position the next bin so that it is ready to lift off of the bin track. For example, the forklift driver can pull the commodity bin 8 out after treatment. The forklift driver can then activate the gear reduction motor 9 from his seat, by using any known remote control device, which will then automatically position the commodity bin 7 at the opening of the end door 23. After unloading the commodity bin 7, the commodity bins 6 and 5 can then be positioned by again activating the gear reduction motor 9 which uses the push rod 20 to position the commodity bins 6 and 5, so that they are ready for unloading.

The conveyor system is important in providing an air seal between the upper and lower plenums, ensuring that all the air is forced through the commodity rather than bypassing it. The bin track 12 is comprised of a low friction material covering a steel support member connected to the chamber wall. The low friction material forms an air seal between the sides of the commodity bins and the chamber walls. Compressible padding on the inside of both of the end doors 22 and 23 compresses against the outside commodity bins 5 and 8, forming a seal to prevent air leakage between the outer commodity bins and the end doors. The fan sealing plates 15 which extend upward from the bin track 12 prevent air leakage between the end of the inner commodity bins 6 and 7 and the fan/heat exchanger assembly 10 and 11.

The use of rollers to facilitate the chamber loading process, as used in treatment chambers of the prior art, creates difficulties in achieving a good air seal between the bins and the chamber walls. A good air seal between the bins and the chamber walls will ensure that the heating air does not bypass the commodity. One method used in the prior art to alleviate such difficulties consisted of positioning sealing material on the side of the chamber walls, relying on compression of the sealing material by the commodity bins to maintain the air seal. However, this method has drawbacks because the sealing material impedes the loading and unloading of the bins and will be worn away, over tine by the friction of the passing bins.

The placement of the fan/heat exchanger assembly 10 and 11 inside the treatment chamber eliminates the heat losses and airflow inefficiencies prevalent in the chambers of the prior art which employ fan(s) and heat exchanger(s) external to the treatment chamber. The interior placement of the fan/heat exchanger assembly 10 and 11 also serves to minimize the variations of the temperature distribution between the commodity bins and within the commodity in the commodity bins.

The design of the chamber of the present invention also does not use any ducts to circulate the air within the chamber. The ductless construction of the chamber lowers the construction and operating costs and increases the efficiency of the chamber. The commodities themselves, stored in the bins, along with the plenums above and below the fruit, provide the return passage for the airflow.

The fan/heat exchanger assembly 10 and 11 can be of any known type of fan and heat exchanger, including but not limited to centrifugal, axial or reversible. The fan of the preferred embodiment is both axial and reversible allowing the air flow within the chamber to be reversed.

During treatment of the commodities, the chamber of the present invention is controlled by a computer which monitors the temperature inside the chamber and can increase or decrease the temperature as needed. A plurality of temperature probes are inserted into commodity samples distributed within each commodity bin inside the chamber into spots within the chamber which take the longest elapsed time to reach the fruit center kill temperature called "cold spots." The cold spots within each chamber are determined during a certification process in which a relatively large number of commodity probes are distributed throughout the chamber and monitored by a plurality of computers. These computers then record the temperature of each probe over the treatment period to identify the location of the cold spots within the chamber.

After the cold spots are determined, during regular operation of the treatment chamber, a limited number of temperature probes are inserted into the center of fruit and placed at the cold spots, usually one probe per commodity bin. The temperature measured by each of these probes is then monitored by the computer to indicate when quarantine conditions have been satisfied. During treatment, the air within the chamber is gradually heated up to a temperature in the range of 48.5° C. to 48.7° C. causing the center of the fruit to heat up slowly to a temperature of 47.2° C. Once the center of the fruit reaches this temperature the insect is considered to be exterminated and the fruit is then cooled to ambient temperature. To avoid potential damage to the commercial qualities of the fruit the center of the fruit should not be heated to a temperature exceeding 48.5° C. In order to reduce the risk of not exceeding a possible damage temperature of 48.5° C., the uniformity of the air temperature within the bins of the present invention is required. If the temperature of the fruit at the cold spot varies greatly from the temperature of other fruit in the bin, then it is possible that while the fruit at the cold spot has not yet reached the insect death point temperature, fruit that is not at the cold spot will have exceeded the suspected damage temperature of 48.5° C. and will be damaged. The chamber of the present invention is designed to create uniformity of temperature throughout the chamber and minimize the loss of fruit from overheating.

The time for treatment in the chamber of the present invention is approximately four to five hours for papayas. During the first three hours of this treatment the relative humidity of the air inside the chamber is kept in the range of 60–70 percent. During the last hour of the treatment the relative humidity of the air inside the chamber is raised to 85 percent.

The chamber of the present invention is designed to be installed at a packing house, where the commodities are brought in from the fields, after picking. The chamber can be installed in the middle of the packing house with a wall built over the chamber separating the area where the chamber is loaded from the area where the chamber is unloaded. The wall is used to form a barrier between a insect-free zone, where the commodities are prepared for shipping and the area where the commodities are unloaded and prepared for treatment after being brought in from the fields. The treatment chamber forms a disinfestation airlock between the two areas so that only one end of the chamber can be open at a time. During the loading of the commodity bins into the chamber only the loading end doors 23 are opened and the opposite end doors 22 remain shut thus preventing insects from the commodities from getting into the insect-free zone. After treatment, when all the insects have been exterminated, only the unloading doors 22 to the chamber are open and the treated fruit is unloaded from the chamber into the insect-free zone and prepared for shipping. After treatment, the commodity is loaded into sealed containers to prevent reinfestation by insects during transportation of the commodity.

Figure 6:
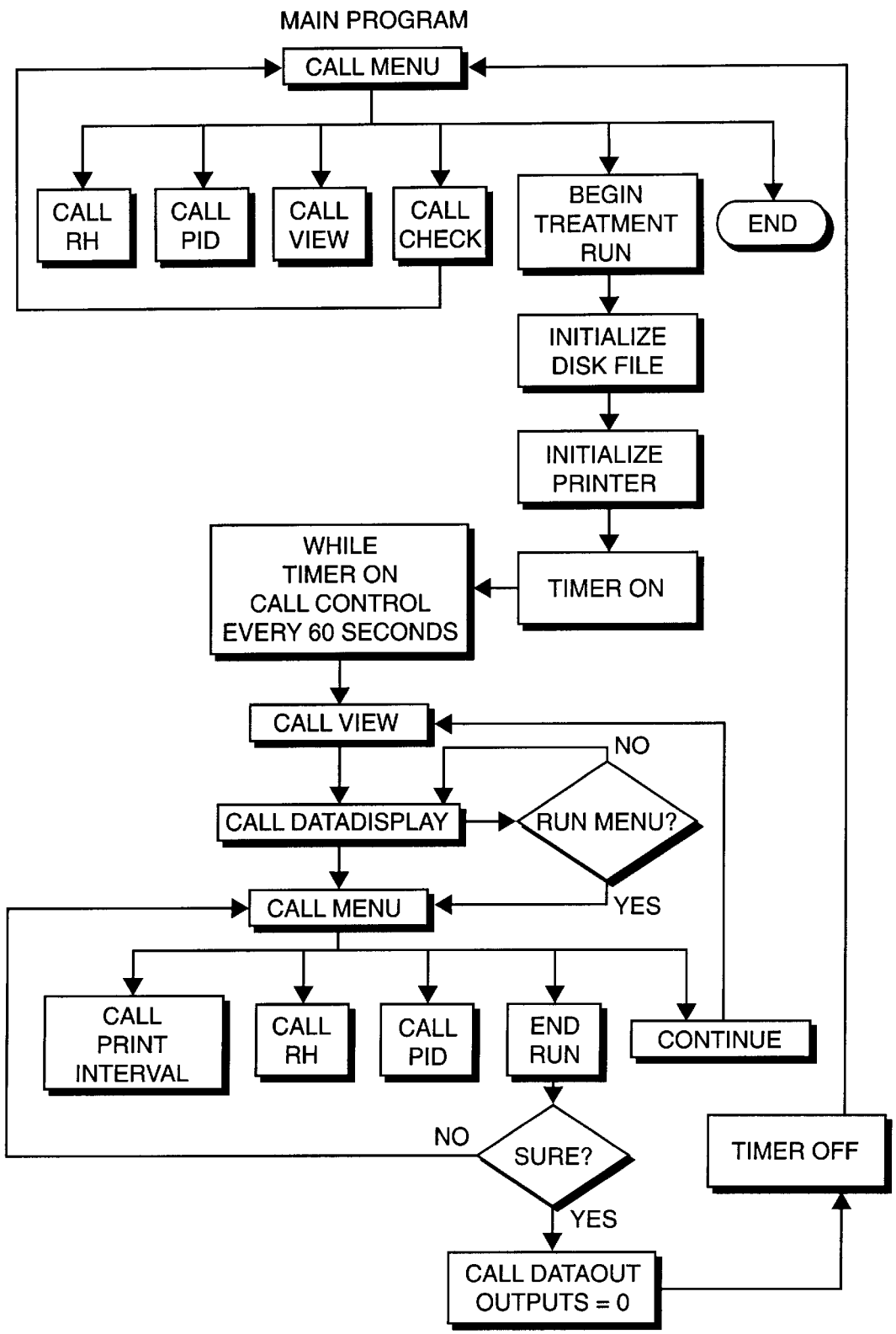
FIG. 6 illustrates the main program flowchart of the software used to control the treatment of commodities inside of the chamber.

The software used to control the treatment chamber of the present invention is illustrated in the flowcharts of FIGS. 6–15. FIG. 6 illustrates the flowchart of the main program used to control the treatment of commodities inside the chamber. The main program first calls the subroutine MENU, illustrated in FIG. 14, which displays a list of options available and allows a user to select an option from the list. As soon as the user has selected from the menu the software exits the subroutine MENU and calls the necessary subroutine according to the option chosen by the user.

Figure 7:
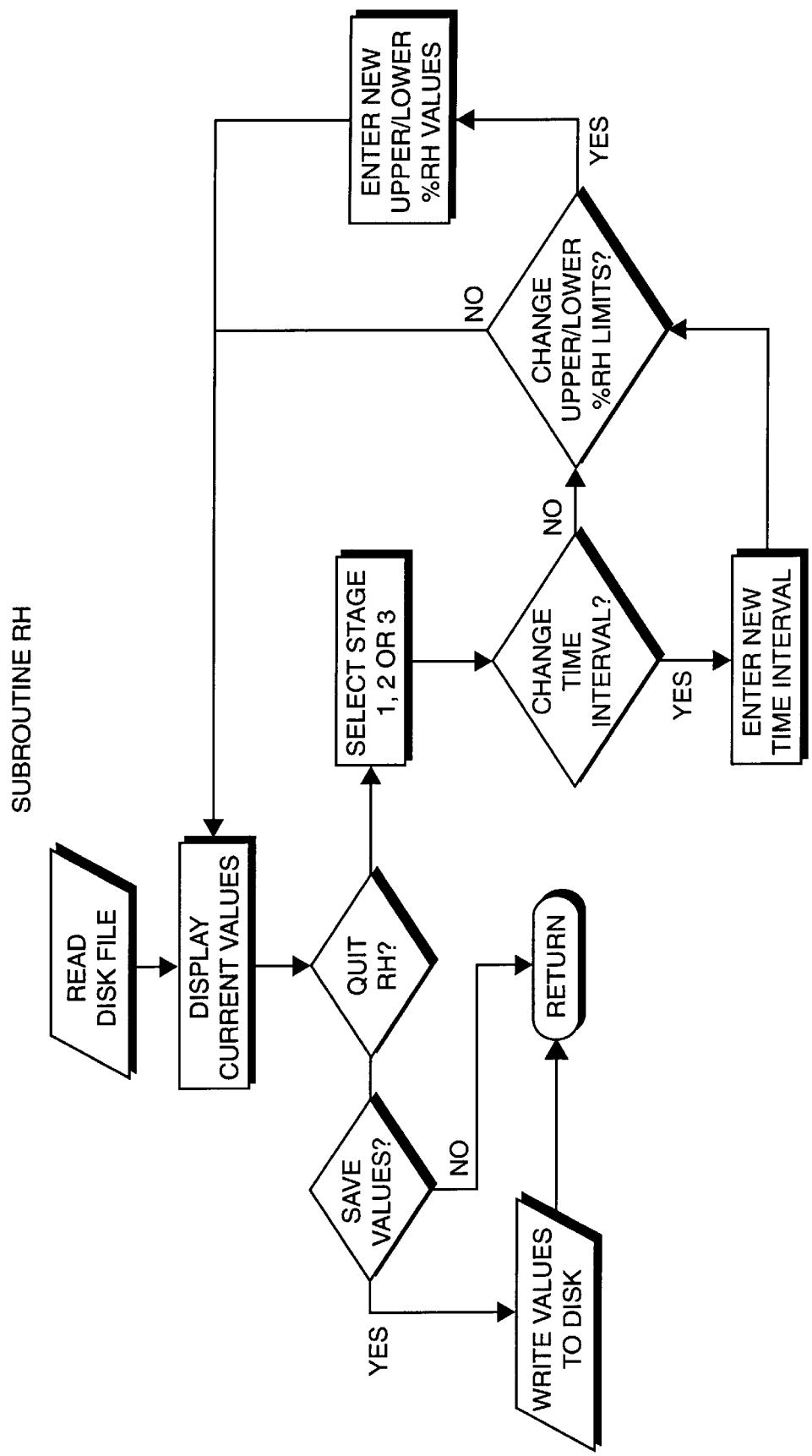
FIG. 7 illustrates the subroutine flowchart for the subroutine RH used to control the relative humidity inside the chamber.

If the user wants to change the relative humidity within the chamber during treatment, the subroutine RH, illustrated in FIG. 7, is called. The subroutine RH first looks up the current values stored for the relative humidity inside the chamber during treatment and displays those values. The software then asks the user whether the user wishes to change the values for relative humidity. If the user enters no, they do not want to change the values, then the values are saved and the subroutine MENU is called. If the user does want to change the relative humidity values then the software asks the user whether they wish to change the time interval. If the user wishes to change the time interval then the new time interval is entered and the user is then asked whether or not they wish to change the upper or lower relative humidity limits. If the user does not wish to change the time interval, they are immediately asked whether or not they wish to change the upper or lower relative humidity limits. If the user does wish to change the upper or lower relative humidity limits the new limits are entered. After the new limits are entered or if the user did not wish to change the upper or lower relative humidity limits, the current values are displayed and the user is again asked if they would like to change the relative humidity values. If the user enters no, they do not want to change the values, then the values are saved and the subroutine MENU is called. If the user enters yes, that they do want to change the values, then the process is duplicated.

Figure 8:
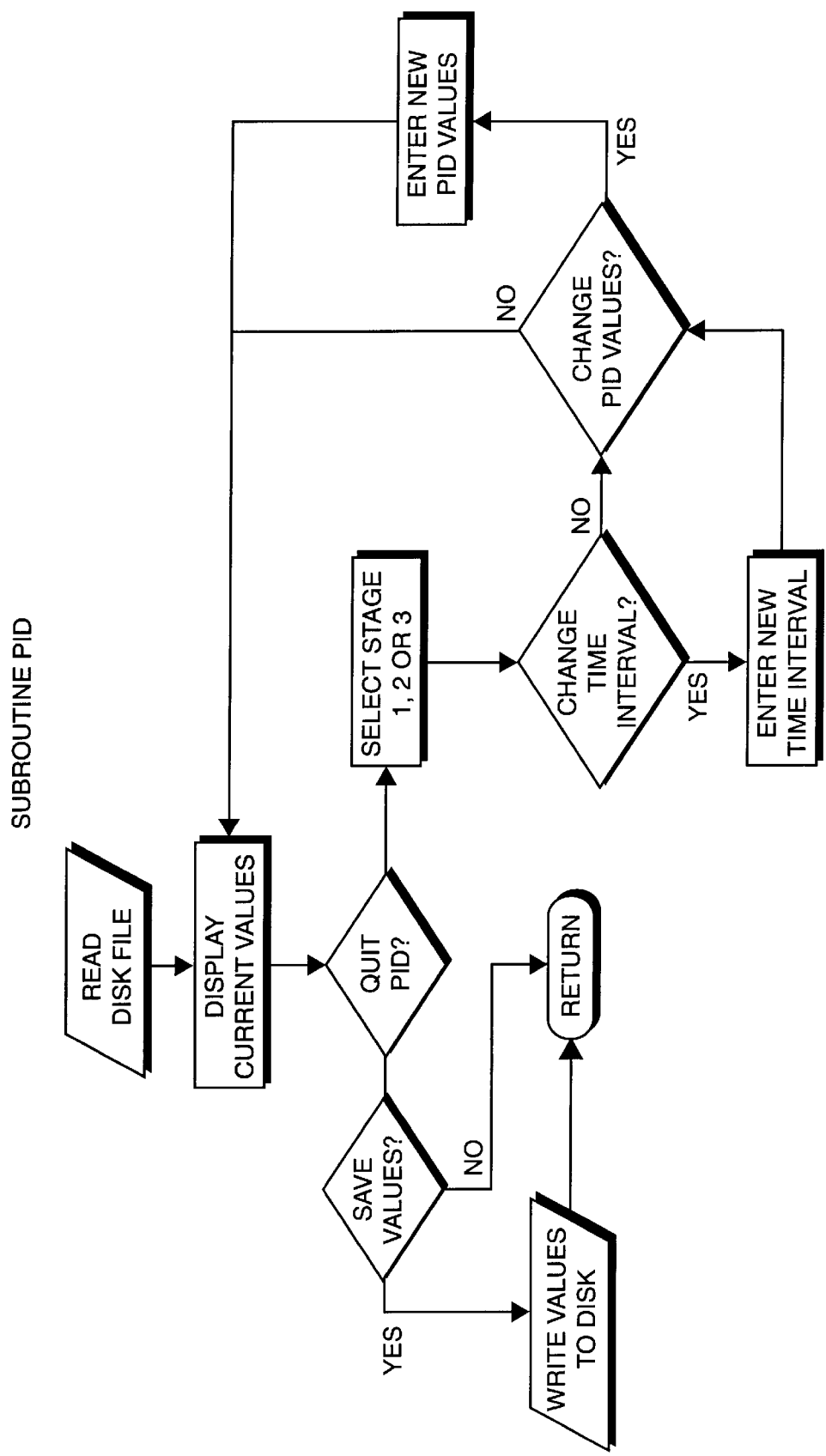
FIG. 8 illustrates the subroutine flowchart for the subroutine PID used to control the air temperature inside the chamber.

If the user wishes to change the time interval values to be used during treatment, the subroutine PID, illustrated in FIG. 8, is called. The current time interval and proportional integer values are looked up and displayed and the user is asked whether or not they wish to change the time interval values. If the user does not wish to change the time interval values or the proportional integer values, they are saved and the subroutine MENU is called. If the user does wish to change the values they are then asked whether they would like to change the time interval. If the user wishes to change the time interval then the new time interval is entered and the user is then asked whether or not they wish to change the proportional integer differential values. If the user does not wish to change the time interval they are immediately asked whether or not they wish to change the proportional integer differential values. If the user does wish to change the proportional integer differential values the new values are entered. After the new values are entered or if the user did not wish to change the proportional integer differential values, the current values are displayed and the user is again asked if they would like to change the values. If the user enters no, they do not want to change the values, then the values are saved and the subroutine MENU is called. If the user enters yes, that they do want to change the values, then the process is duplicated.

If the user wishes to view the names and location of the inputs and outputs of the treatment chamber, the subroutine VIEW, illustrated in FIG. 9, is called. The names and locations of the inputs and outputs are displayed until the user enters a command to instruct the computer that the inputs and outputs do not need to be displayed any longer. Once the user enters the command to terminate the input/output display control is again returned to the subroutine MENU.

Figure 13:
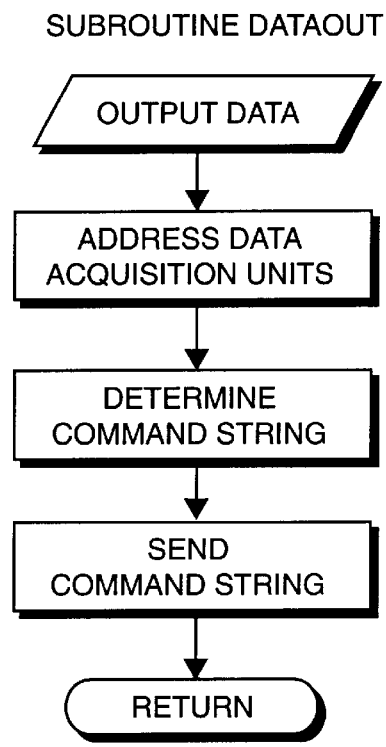
FIG. 13 illustrates the subroutine flowchart for the subroutine DATAOUT used to output the data to control channels.
Figure 14:
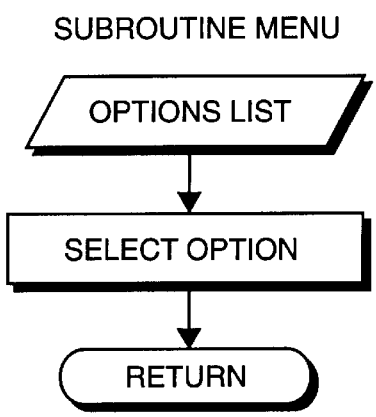
FIG. 14 illustrates the subroutine flowchart for the subroutine MENU used to display the main menu of the software to allow a user to select an option.
Figure 15:
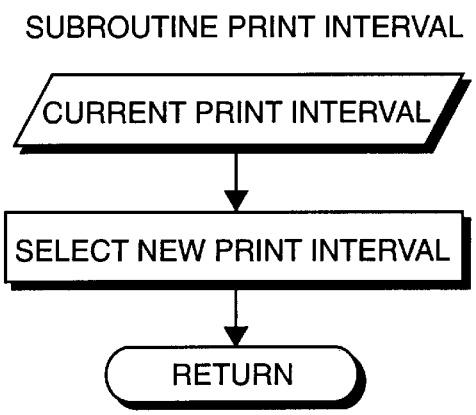
FIG. 15 illustrates the subroutine flowchart for the subroutine PRINTINTERVAL used to change the time interval that data is sent to a printer.

If the user wishes to change the inputs and outputs, the subroutine CHECK, illustrated in FIG. 10, is called. The subroutine CHECK first displays the data outputs and temperature offsets and then calls the subroutine DATAIN, illustrated in FIG. 12. The subroutine DATAIN monitors the temperature measured at the inputs and then returns control back to the subroutine CHECK. The temperature measured at the inputs is then displayed. The user is then asked if they wish to change the temperature offsets. If the user does wish to change the temperature offsets, the new offsets are entered and the subroutine goes back to the step where the data outputs were displayed. If the user did not wish to change the temperature offsets, they are then asked if they wish to change the data output. If the user does wish to change the data output, the current data outputs are changed and the subroutine DATAOUT, illustrated in FIG. 13, is called. The subroutine DATAOUT outputs the data and then returns back to the subroutine CHECK at the step where the data outputs are displayed. If the user did not wish to change the data output they are then asked if they still wish to change the inputs and outputs. If the user does still wish to change the inputs and outputs the subroutine DATAIN is called and the process, beginning at that step is repeated. If the user does not want to change the inputs and outputs the subroutine MENU is called.

Figure 11:
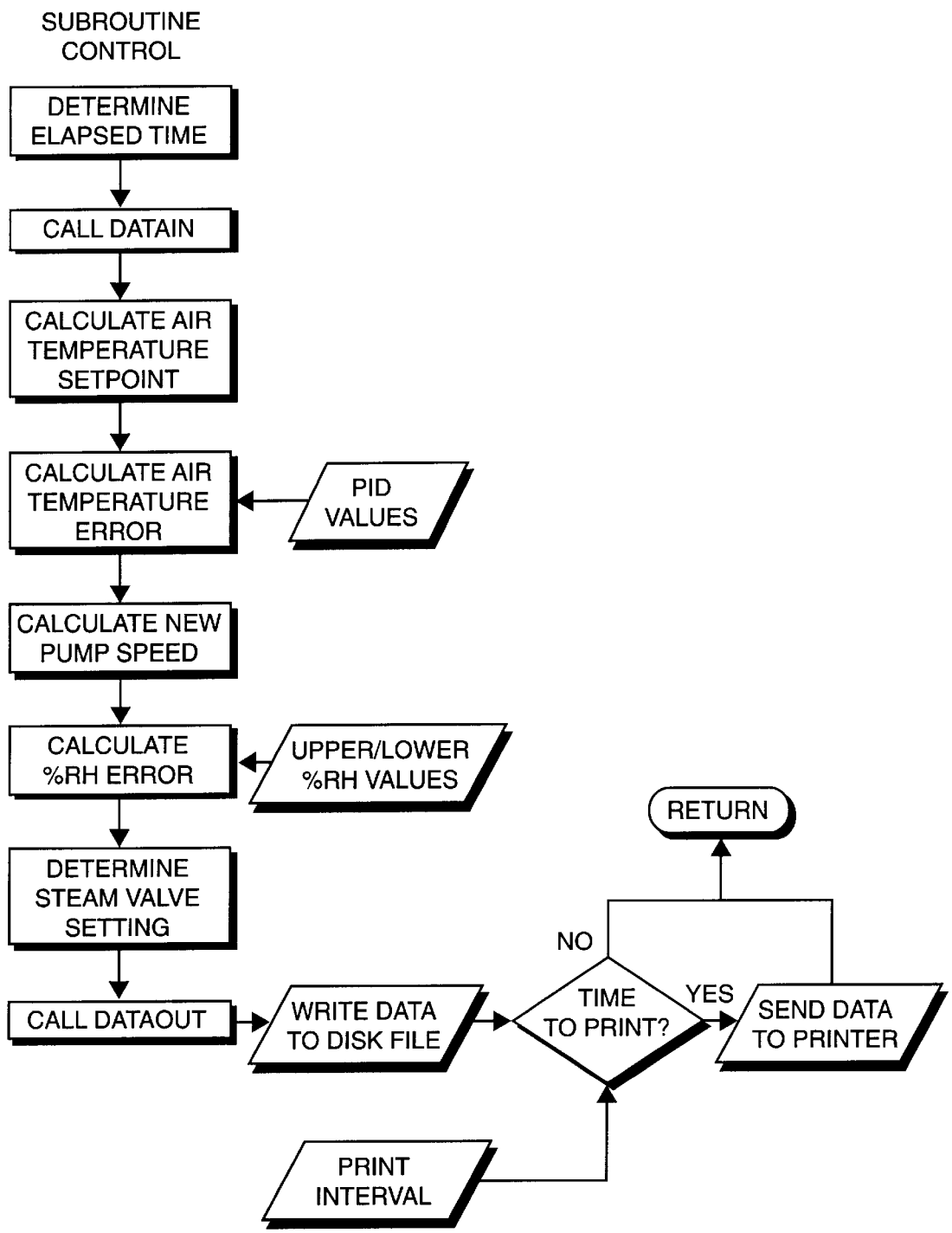
FIG. 11 illustrates the subroutine flowchart for the subroutine CONTROL used to control the operation of the heat exchanger during treatment of commodities inside of the chamber.
Figure 12:
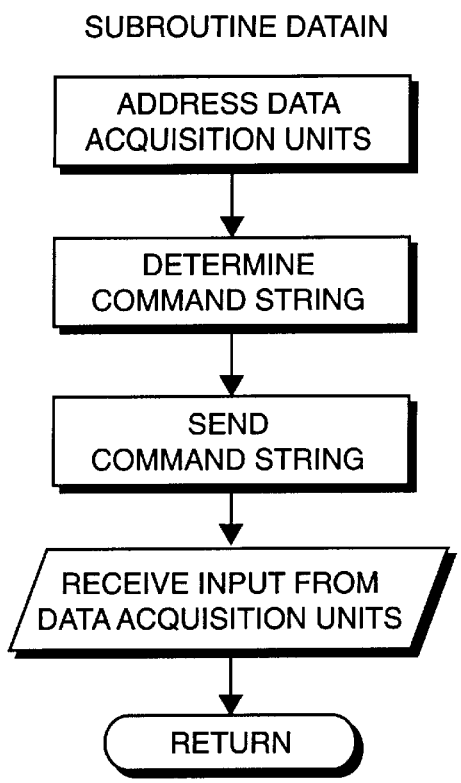
FIG. 12 illustrates the subroutine flowchart for the subroutine DATAIN used to obtain the data from the temperature probes.

If the user wishes to begin a treatment process within the chamber the disk file and printer are both initialized and the timer is turned on. While the timer is on the subroutine CONTROL, illustrated in FIG. 11, is called every 60 seconds. The subroutine CONTROL first determines the time that has elapsed and then calls the subroutine DATAIN which monitors the temperatures at the inputs and then returns back to the subroutine CONTROL. The air temperature setpoint is calculated and then the air temperature error, using the proportional integer differential values, is calculated. The new pump speed is calculated and then the relative humidity error is calculated, using the upper and lower relative humidity values. The steam valve setting is determined and the subroutine DATAOUT is then called. The subroutine DATAOUT outputs the data and then returns back to the subroutine CONTROL where the data is saved in a disk file and it is then determined if sufficient time has passed so that the data should be printed. If the data should be printed, the data is sent to the printer and control is sent back to the main program. If the data should not be printed then control is sent back to the main program immediately. Between sixty second intervals when the subroutine CONTROL is not being called, the main program calls the subroutine VIEW which displays the names and locations of the inputs and outputs. The data is then displayed and the user is asked if they would like to run the subroutine MENU, which will give them a list of options. If the user wishes to run the subroutine MENU all of the options discussed above will be available except the ability to view the data inputs and outputs and the ability to change the temperature offsets and the data outputs. In addition, the user is able to choose to change the print interval. The user is also able to end the treatment run. If the user would like to end the treatment run, the subroutine DATAOUT is called, the data is output, the timer is turned off and the subroutine MENU is called.

Once the treatment is done, a cooldown period is entered to allow the commodity to cool down inside the chamber before the end doors are opened. After the cooldown period is over the commodity bins are unloaded into the insect-free zone and the commodity is prepared for shipping.

DETAILED DESCRIPTION OF A SECOND PREFERRED EMBODIMENT

Figure 16:
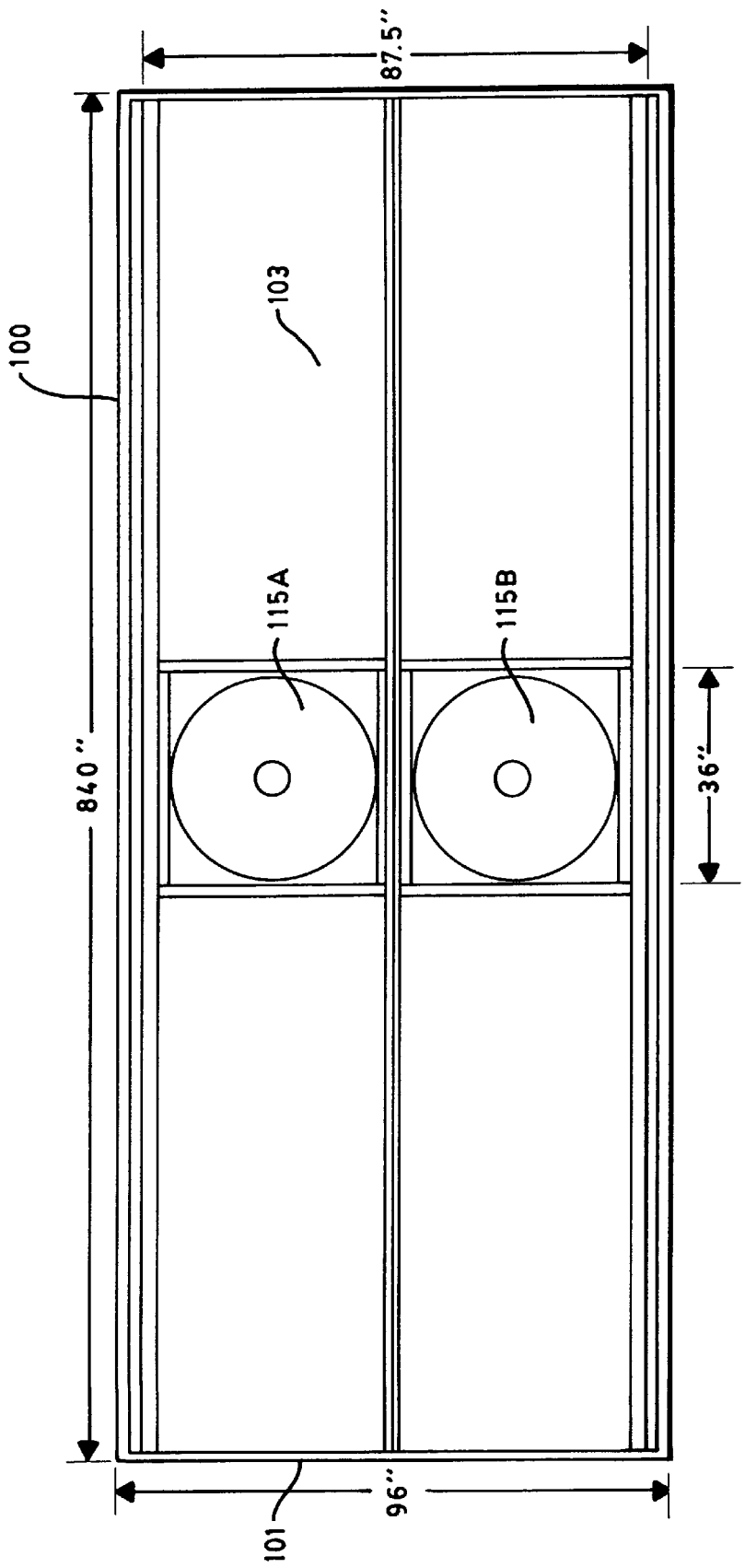
FIG. 16 illustrates the general layout (in a top view) of a second preferred embodiment of the present invention, showing placement of two fans.
Figure 18:
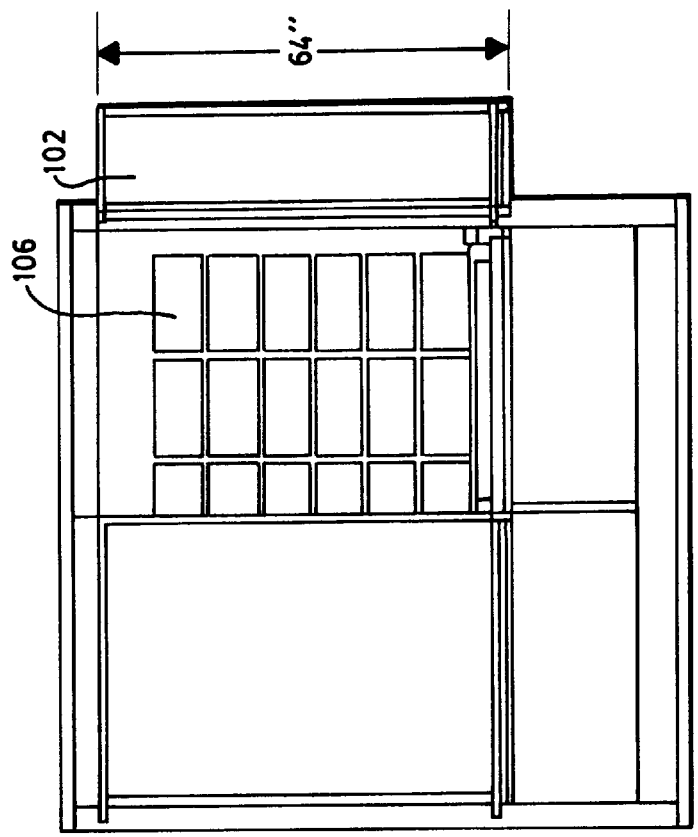
FIG. 18 illustrates (in an end view) the embodiment shown in FIG. 16 loaded with the material to be treated, with the further modifications of swinging doors.
Figure 17:
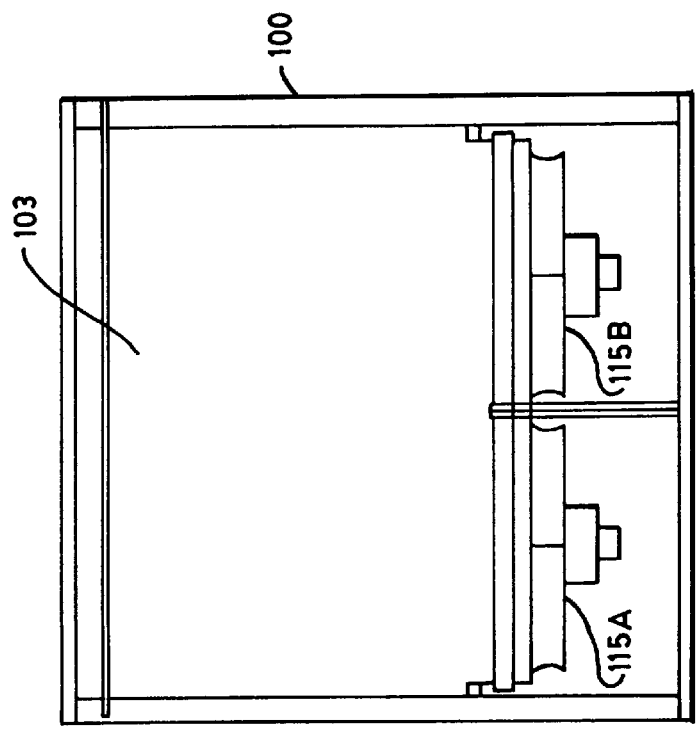
FIG. 17 illustrates (in an end view) the embodiment shown in FIG. 16, with the chamber empty.
Figure 19:
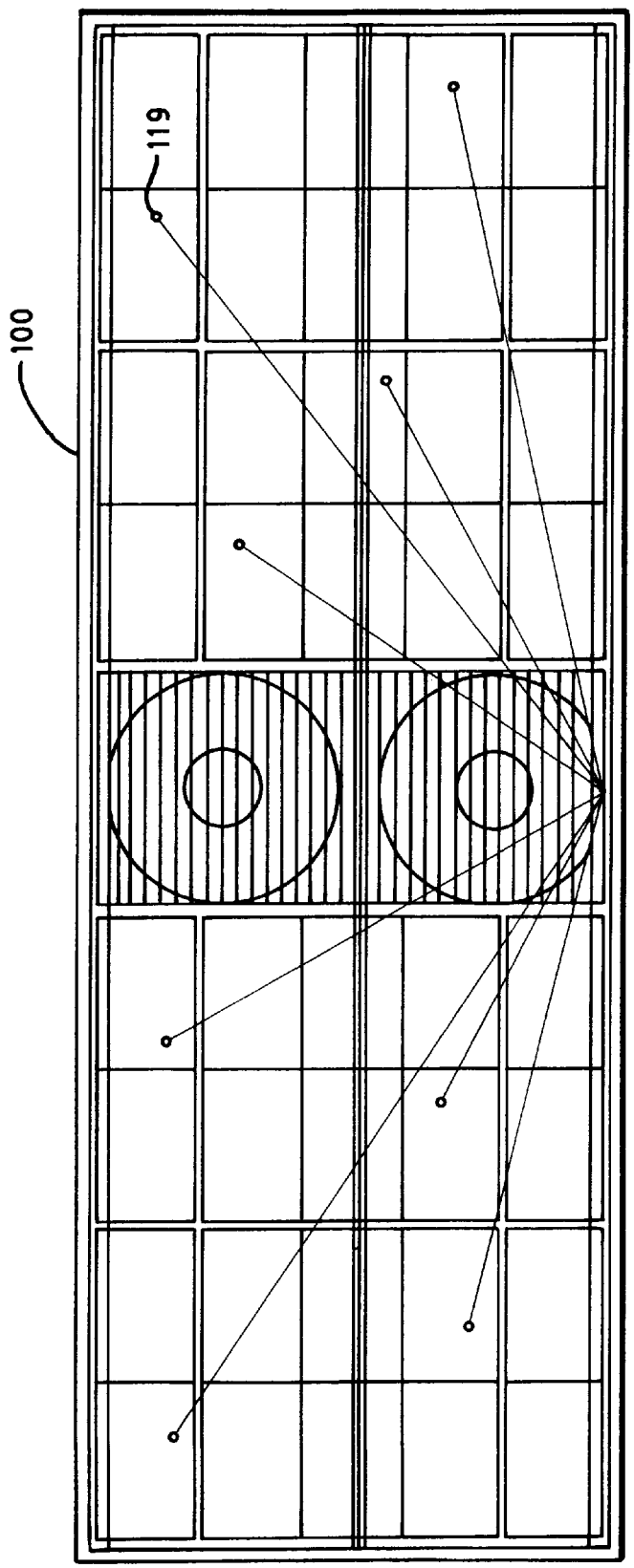
FIG. 19 illustrates (in a plan view) the embodiment shown in FIG. 16, along with possible thermal sensor locations.
Figure 21:
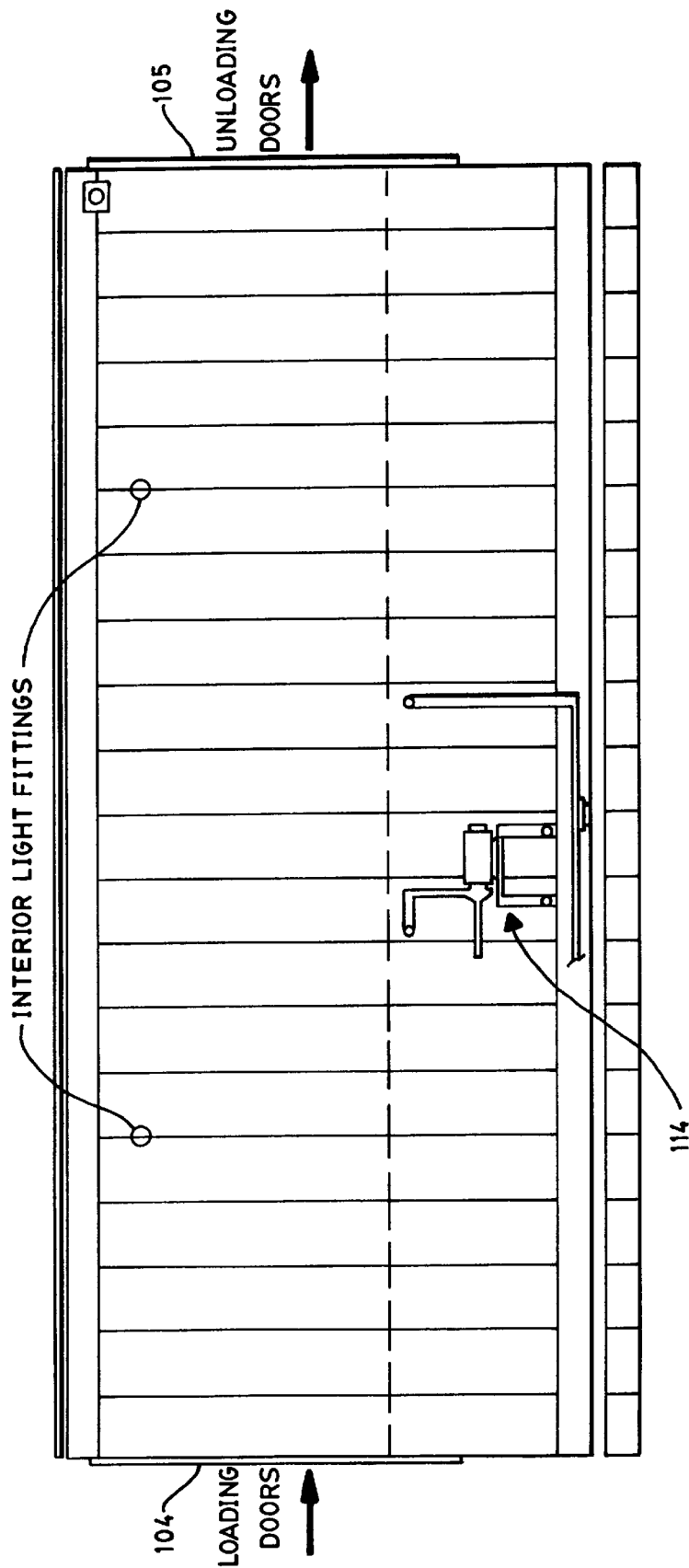
FIG. 21 illustrates (in a side view) the embodiment shown in FIG. 16, showing the placment of the hot water pump.
Figure 22:
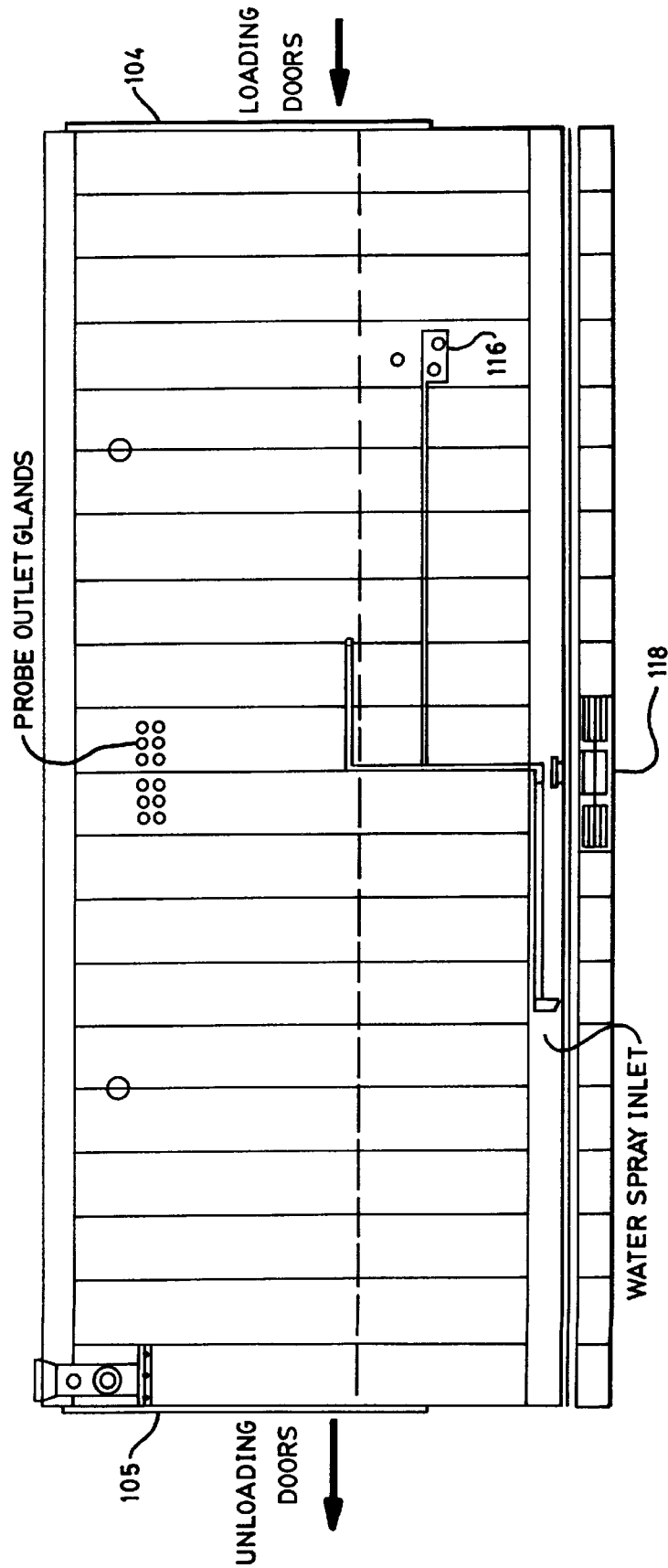
FIG. 22 illustrates (in a corresponding side view) the embodiment shown in FIG. 16, showing the position of the water spray intel, under floor fan and humidity sensor.

This second preferred embodiment can be created from a standard twenty foot marine shipping container (FIG. 16, element 100) built of "Corten" rust resistant mild steel. The closed end has an opening cut to accept a double swing door with steel frame (FIG. 18, 102). The cut out section is used to form the lower end wall section of the opposite end. And identical double door assembly is fitted to replace the original container doors which are discarded. The result is a chamber (FIG. 17, 103) with identical loading (FIGS. 21 and 22, 104) and unloading ends (FIGS. 21 and 22, 105).

Figure 27B:
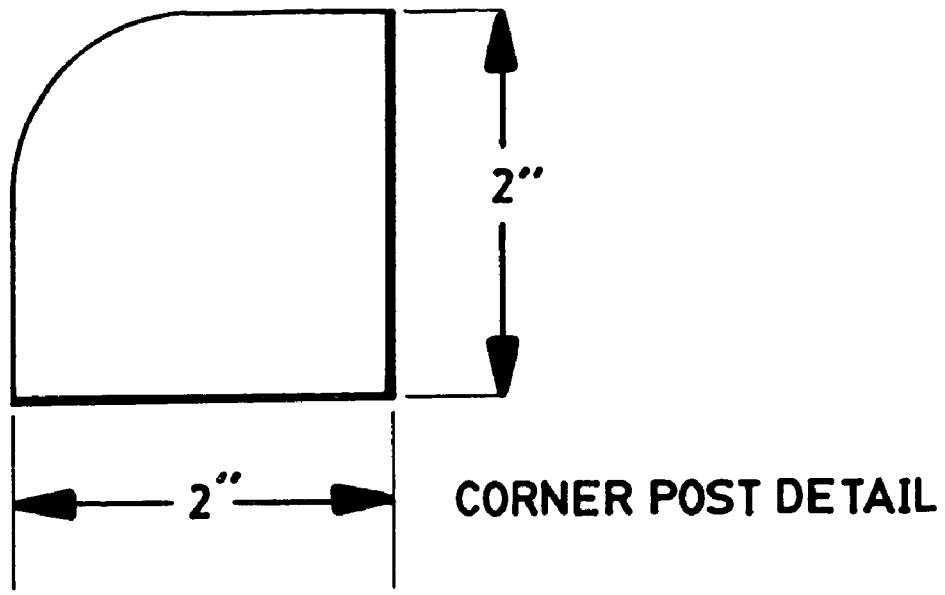
FIGS. 27B and 27C are enlarged illustrations of the corner post and central runner, respectively, of the pallet as shown in FIG. 27D.
Figure 27C:
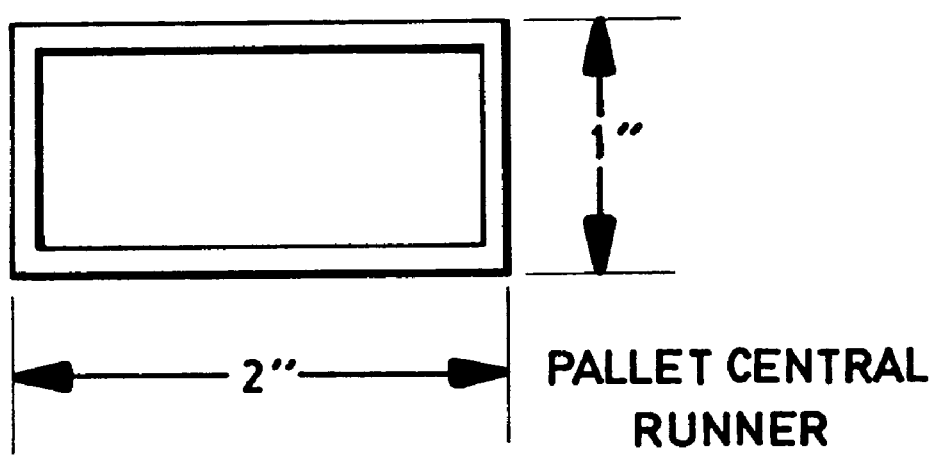

The fruit to be disinfested are loaded into plastic baskets called lugs (FIG. 18, 106). While a variety of dimensions are possible, preferred lugs are those with dimensions of 24" long by 15" wide by 7" high which interlock securely into stacks. The lugs have open perforated bottoms with at least 60% open area to allow unimpeded vertical airflow. The lugs are arranged on pallets (FIG. 27, 107) in layers of ten lugs, supported around their perimeter to avoid any disruption to the airflow. The fruit pallets each hold 60 lugs, stacked six lugs high for a total of 240 lugs.

Figure 20:
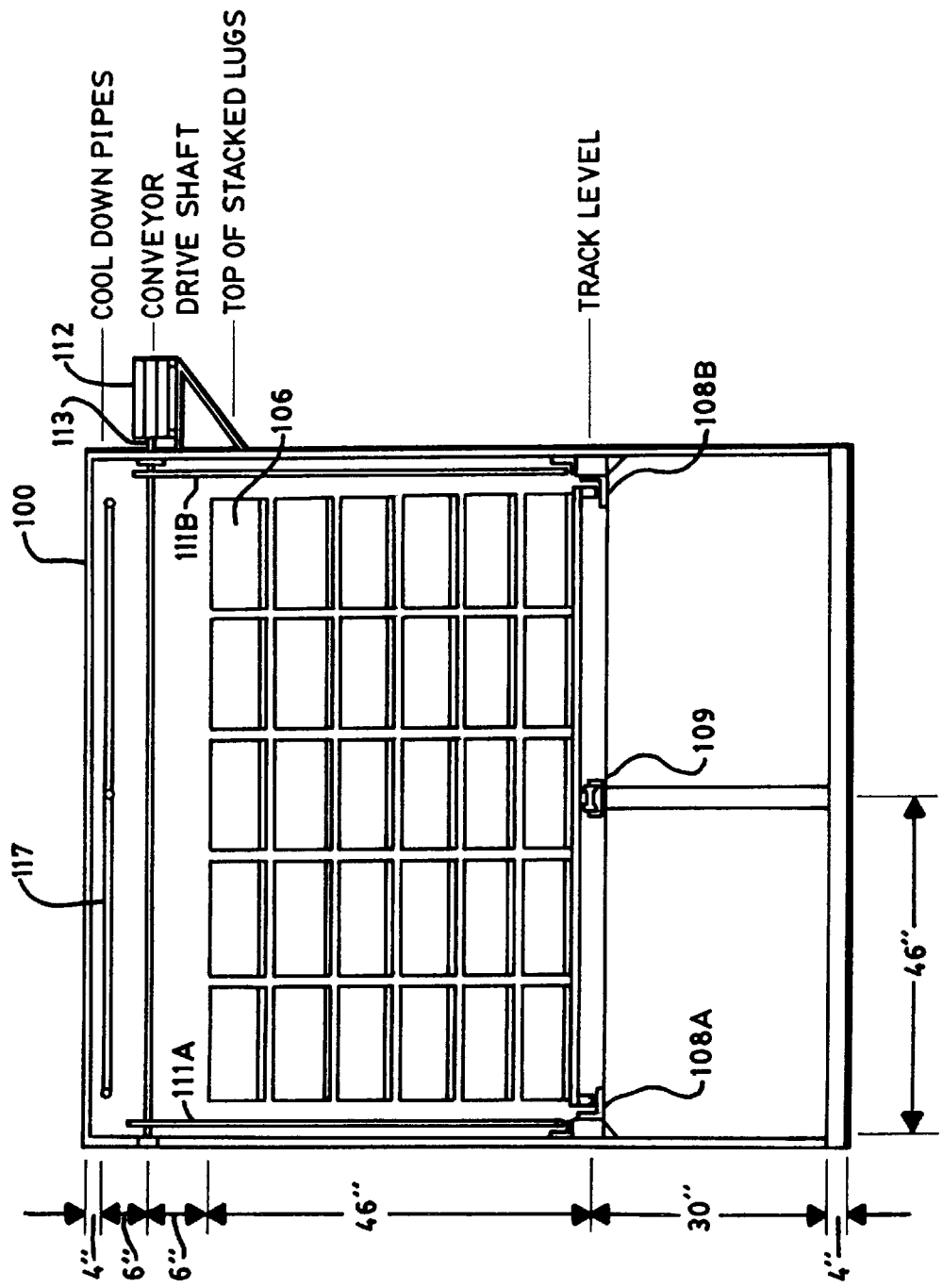
FIG. 20 illustrates (in an end view) the embodiment shown in FIG. 16, with the further modifications of a conveyor system, including a conveyor motor and drive shaft, as well as a center roller track to relieve the weight load on the frictional side tracks.
Figure 23A:
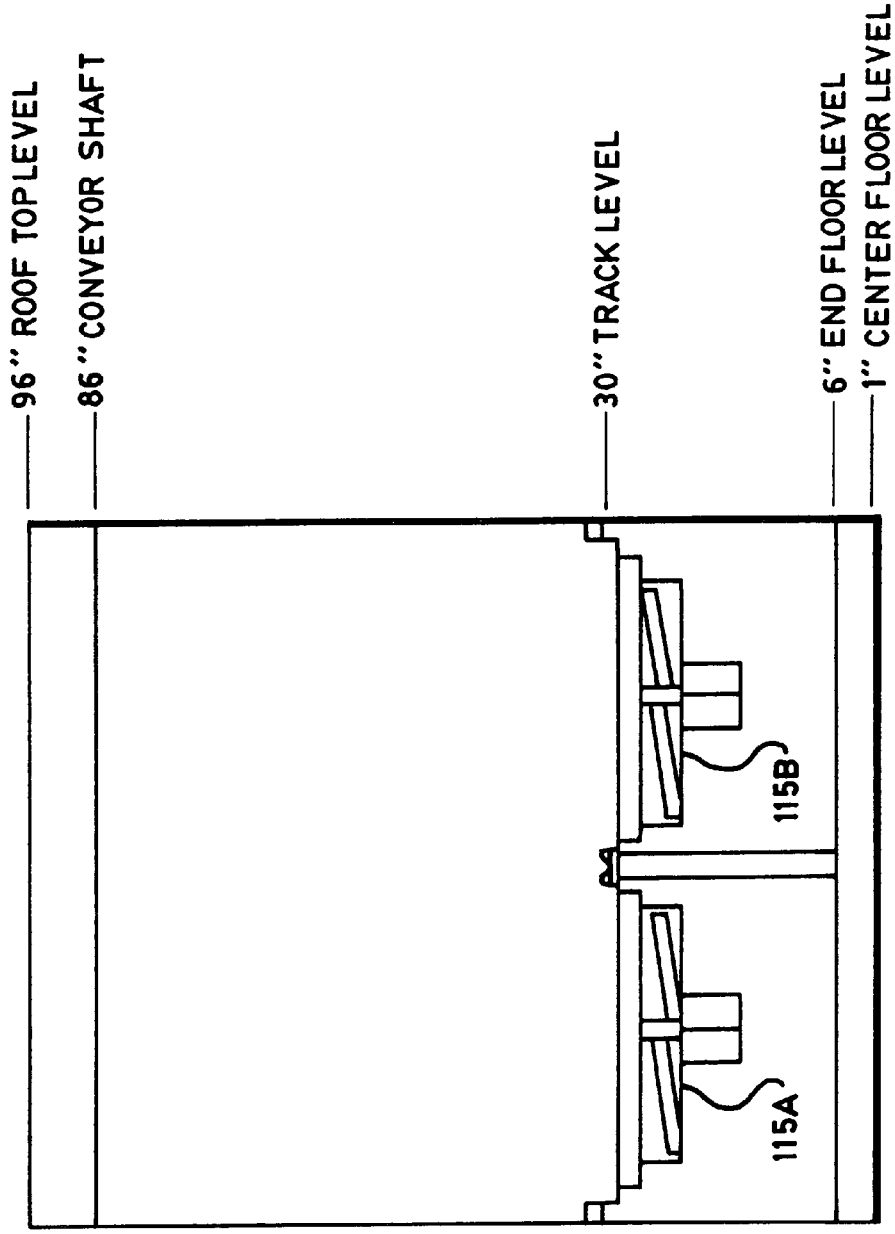
FIG. 23A illustrates (in an end sectional view) the position of the tracks for the container of FIG. 16.
Figure 23B:
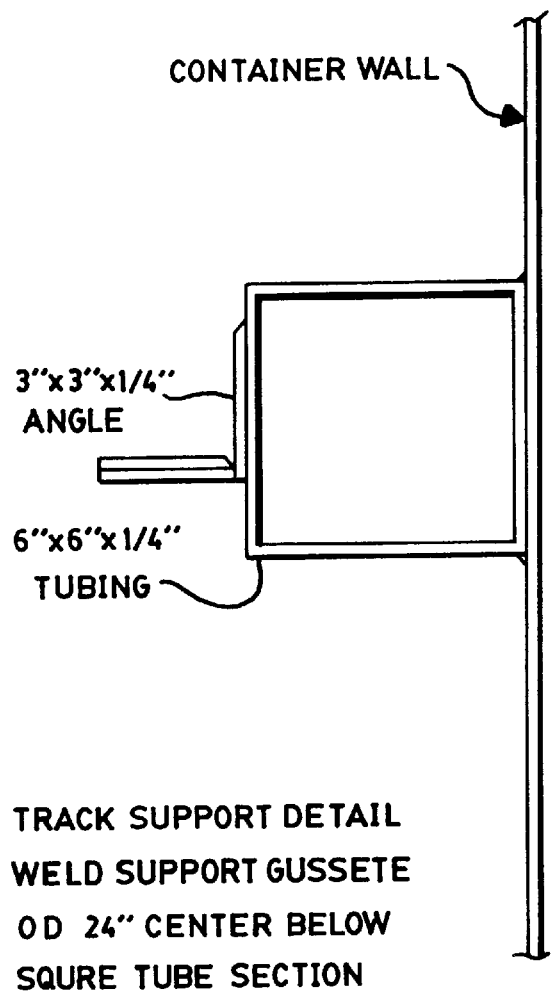
FIGS. 23B and 23C are enlarged illustrations of the track support along the container wall.
Figure 23C:
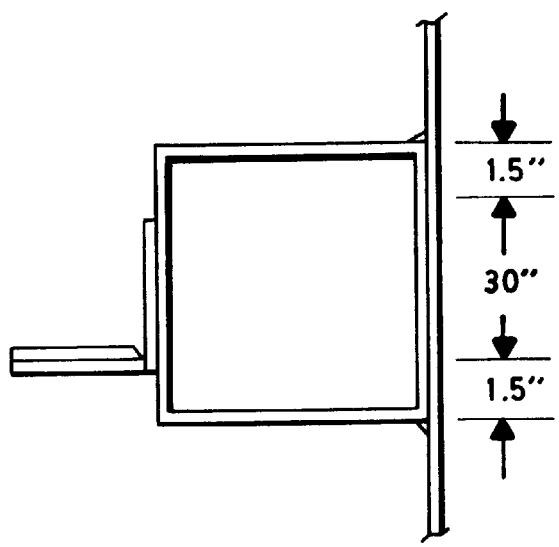
Figure 24B:
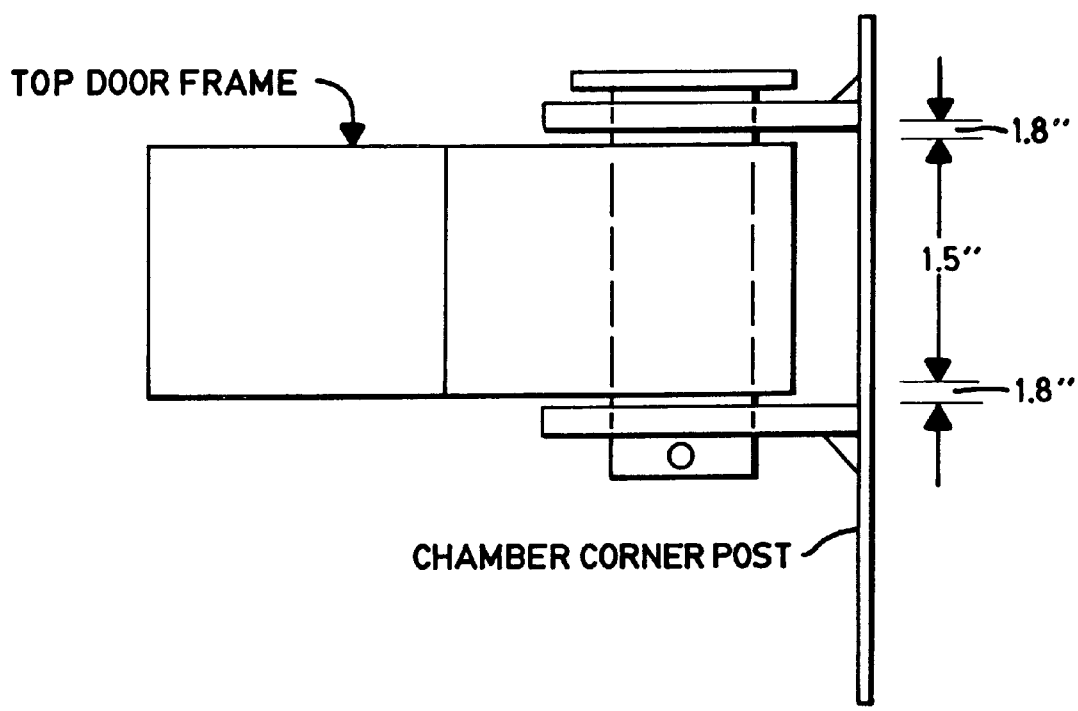
FIG. 24B is an enlarged illustration of the hinged arrangement for the doors.
Figure 24C:
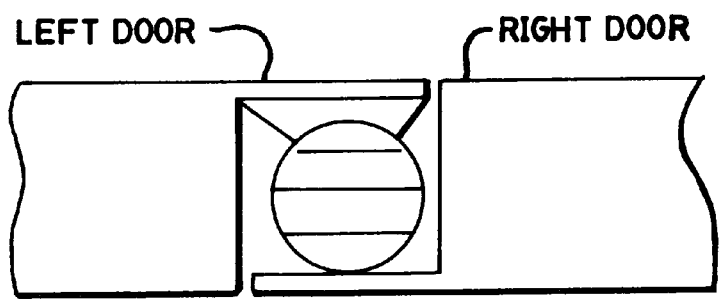
FIG. 24C is an enlarged (top view) illustration of the door center.

The fruit pallets are supported by three tracks, two frictional sealing tracks (FIG. 20, 108A, 108B), one on each side of the chamber and a center roller track (FIG. 20, 109) to support the pallet centers and relieve the weight load on the frictional side tracks. The sliding tracks are preferably made from heavy angle steel with high density polyethylene lining to reduce friction between the pallet runners and the support angle frame. Each base runner (which can be wood strips bolted to the underside of the pallet frame) rests on the smooth polyethylene lined surface of the outer support tracks which are secured to the chamber walls (FIGS. 23B and 23C).

Figure 28:
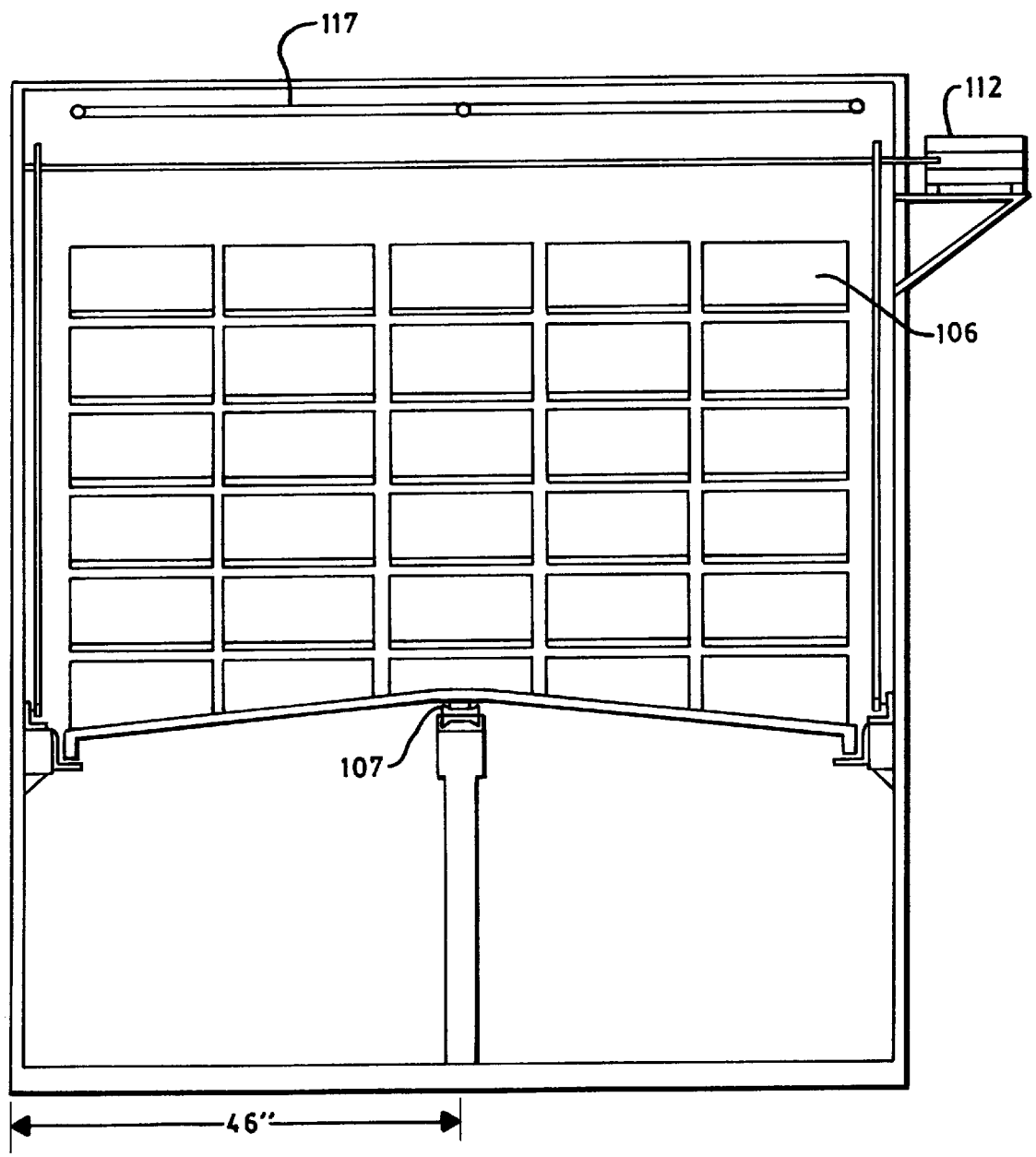
FIG. 28 illustrates (in end sectional view) the function of the roller track to relieve the weight on the side tracks (the frame deformation has been exaggerated for illustration purposes).

The embodiment uses the flexibility of the metal pallet frame to allow modest deformation of the shape of the pallet frame when loaded with fruit (FIG. 28). The pallet has a rectangular metal section runner which fits into the rollers of the center track. The embodiment contemplates that the side runners will form an efficient air seal between the lower and upper plenum chamber when the pallet is loaded. However, if the vertical load is too great the friction exerted on the track will prevent the pallet being pushed along the length of the chamber. If rollers were to be used on the side tracks to facilitate horizontal movement within the chamber, the air seal feature would be lost (causing loss of optimum operating conditions). By using the center roller track (which has no air seal function), this embodiment permits the majority of the weight of the pallet to be supported (FIG. 28), while at the same time allowing the side tracks to carry only enough weight to ensure the air seal without excess friction during the horizontal movement when loading and unloading the chamber.

Figure 26A:
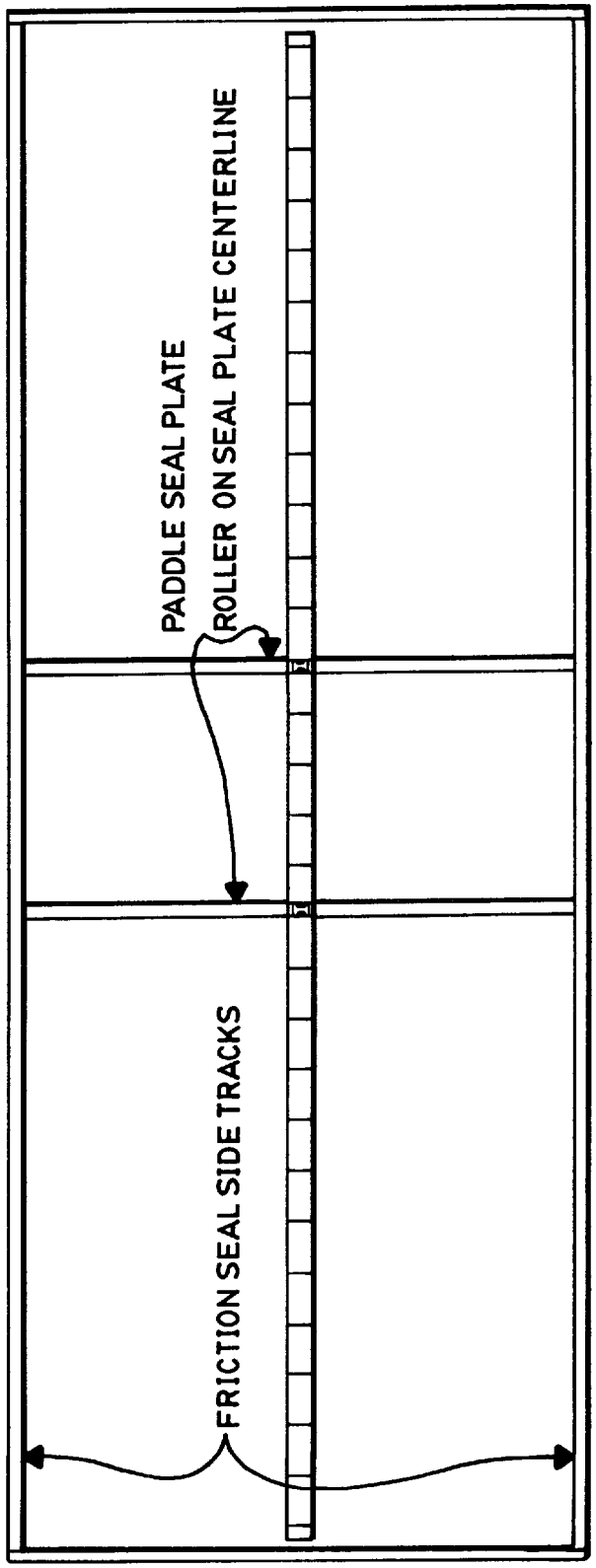
FIG. 26A illustrates (in a plan view) the tracks and roller conveyor for the container of FIG. 16.
Figure 26B:
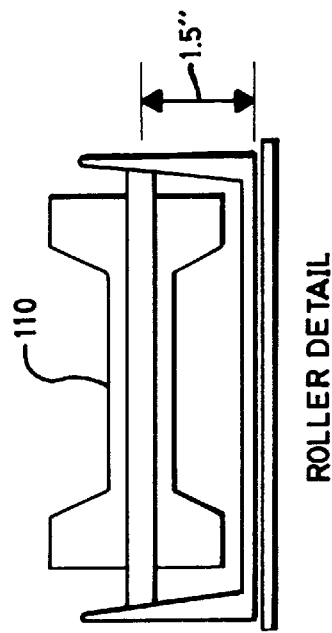
FIG. 26B illustrates (in an enlarged view) one embodiment of a roller for the center roller of the container of FIG. 16.

The center track rollers (FIG. 26B, 110) are preferrably "V" shaped to guide the pallet as it moves into and out of the chamber. Fruit pallets are built of steel angle with lumber side runners. The center rollers (FIG. 26B, 110) are conveniently made of high density molded plastic as used in boat keel rollers.

Figure 25:
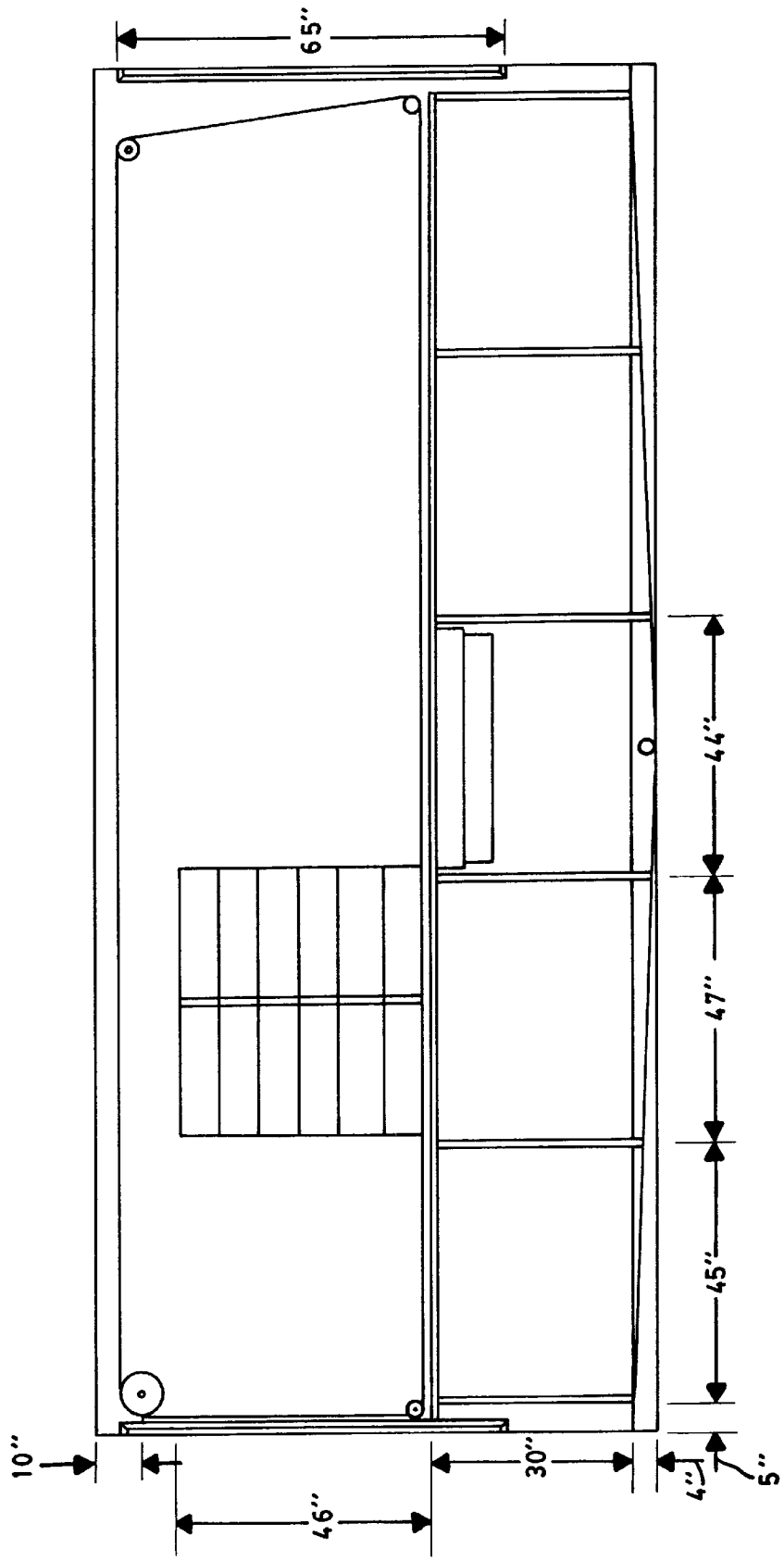
FIG. 25 illustrates (in a side sectional view) the position of the conveyor system, as well as the positioning of a pallet of material to be treated, for the container of FIG. 16.

The pallets (FIG. 27, 107) are loaded onto the support tracks with a forklift (not shown) and moved into position by a conveyor. The conveyor is made up of two ANSI #60 nickel plated roller chains (FIG. 20, 111A, 111B), one on each side of the chamber (FIG. 25, 111A). Two paddles and a cross bar are attached by swivel links onto the chains, the paddles and rod extending across the width of the chamber to push the pallets. In addition, the paddles form the seal between the pallets and the heat exchanger edges. The travel of the conveyor is controlled by push button switches at each end of the chamber. The pallets cannot be pushed completely out of the chamber, a dangerous situation, because of the travel limit switch fitted to the unloading end of the track.

The conveyor motor (FIG. 20, 112) is a gear reduction unit by "SEW Europe" company with a 2 hp electric 230 volt three phase motor controlled by the push button and limit switches through a three pole contactor. The conveyor motor (FIG. 20, 112) is mounted externally at the unloading end to reduce the tension length of the chain. The conveyor drive shaft (FIG. 20, 113) is steel with 2" diameter fitted with two sprockets of 28 #60 teeth. Taper lock shaft bushings with internal cut keys hold the sprockets securely to the shaft. The shaft is supported on each end by Fafnir sealed roller bearing mounted in a flange type housing. This ensures an airtight seal between the shaft and the chamber wall on the side where the shaft extends out to the motor. The non-motor side has the shaft terminate within the chamber behind the flange bearing. All bearings can be lubricated externally. The conveyor chain passes over 16 tooth #6 sprockets bolted to Browning taper lock idler bearings mounted on angled frames. The conveyor chains can be tightened by movement of the angled idler bearing frames. The path of each chain follows a rectangular pattern (FIG. 25) with the drive shaft at one corner and three idler assemblies at the remaining three corners within the chamber.

A single pass heat exchanger built of copper tubes and aluminum fins is used to heat the circulating air. This exchanger is custom made by AeroFin Corp. The copper tubes are ½" diameter and form a "U" shaped pattern leading from and returning to a single mainfold. The inlet and outlet water pipes to the heat exchanger are 1.5" diameter galvanized nipples. An air bleed port is fitted to the mainfold above the supply pipe inlet. Union connections are used to connect the exchanger to the pump (FIG. 21, 114) and pipe system to allow for easy removal and repair.

Hot water, (160° F.), from a standard gas water heater is pumped through the heat exchanger by a variable speed "Teel" brand 2 hp centrifugal pump. The pump speed is controlled by the computer through a 230 volt three phase frequency inverter made by GEC. Dynamic pressure within this closed system is maintained by a AMPCO expansion tank in the region of 20 psi.

The air circulation within the chamber is from the bottom of the stacks, through the fruit to the top and is unidirectional throughout the run. The air flow is driven by two identical axial fans (115A, 115B) made by Aerovent Corp. The fans have six cast aluminum blades with a pitch of 28° and are driven at 1,400 rpm by two 7.5 hp electric motors. The motors are by "Baldor," 460/230 volt three phase water proof hazardous duty industrial grade designed for continuous running. The fan motors can be controlled by a "Zener" frequency inverter or by three pole contactor. All motors have safety cut out switches located at the chamber and are fused. Airflow within the chamber is in the region of 24,000 cfm depending upon fruit type.

Relative humidity is monitored by a wet bulb RTD thermal sensor (FIG. 22, 116) by "Omega Engineering" which has bath fed wick. An automatic float maintains the water level in the wick bath to ensure the proper action by the wet bulb sensor which is covered by the wick. The dry bulb temperature is monitored by a similar sensor located close to the wet bulb sensor. The computer scans these sensors every sixty seconds and calculates the relative humidity. If additional moisture is required to maintain the relative humidity at a predetermined level, clean water is sprayed onto the upwind side of the heat exchanger from two small misting nozzles ensuring complete vaporization of the water into the circulating air. A pressure control valve and fine filter are fitted upstream of the mister and water bath to ensure consistent performance regardless of the incoming supply pressure.

Condensation within the chamber is restricted to the walls and floor. The ceiling is insulated by a layer of new carpet underlay material secured to the roof prior to any electrical services being laid down. This ensures that no condensate can form and drip onto the fruit from the ceiling.

The cool down system (FIG. 20, 117) for cooling fruit once quarantine has been achieved, is a network of pipes attached to the ceiling above the conveyor. Water is distributed through ⅛" holes drilled into the pipes in a way to ensure that all fruit are properly sprayed with cooling water. The cooling water is supplied at an incoming pressure of at least 20 psi either from a municipal water supply or form a recirculating cooling tower. Fine filters in the system ensure the water is clean and fly free. The flow is controlled by an electric valve operated by the computer which can also switch on any required pumps. There are two three inch drain outlets with water traps fitted to the floor.

Since most of the heat being added to the system is from frictional conversion of the air flow, the air temperature within the chamber could overheat toward the end of the run when the heat demand by the fruit is minimal. This overheating is prevented by a small squirrel cage fan (FIG. 22, 118) driven by a 1 hp motor (Dayton) which blows ambient cooling air under the floor of the chamber under computer control. The air enters the underfloor space at the center and exits equally at each end through a double layered screen. This allows the temperature to follow the air set point temperature closely and so protects the fruit from damage by excess heat.

The fruit temperatures are monitored by platinum three wire RTD sensors by "Omega Engineering." The lead wires to the sensors are enclosed in waterproof stainless steel armor to protect them from abrasion. The actual sensors are located at the tip of a ⅛" diameter stainless steel sheath 3½ inches long which is inserted into the largest fruit in each batch by APHIS inspections. Each stack of 60 pallets is monitored by three sensors placed in locations selected by APHIS inspectors. The total of twelve sensors provides the database upon which quarantine security is determined by the computer. The sensors are routed to a data transfer box located close to the chamber where each channel is connected to a multiple channel, screened and grounded cable connected to the control system in the computer office. If a sensor needs to be replaced it is an easy procedure to release the connections in the transfer box, remove the old sensor from the chamber and replace it with a new sensor. The sensor leads pass through the chamber wall above the stacks through a cable gland and all leads are supported by a bridge frame to prevent sensor cables being damaged by the movement of the pallets.

The data acquisition system is based upon Omega Engineering Company "OM6" data products. The RTD modules, one for each sensor, are mounted on a backplane (OM6BP-232-16) which in turn is linked to the computer through the RS-232 serial port. All sensors are uniquely addressed and the software program has self diagnostic features to warn operators of any failure in the electronics. All digital functions such as underfloor fan, mister valves or water cool down valves are controlled by an Omega digital switching board (OM6-DIO) and digital switch blocks mounted on the backplane (OM-6000-EXB). All electronics are powered by a stabilized computer power supply isolation transformer which in turn is supplied through a "TripLite" surge protector. All equipment is mounted into a protective steel cabinet which has internal cooling fans and is grounded.

The computer is a 166 Pentium powered "Compaq" model 4160 or similar with an "Epson LX300" printer. The software is prepared by Paul Winkelman of the Department of Mechanical Engineering at the University of Calgary. All software is supplied in executable format only, to prevent the end user having any access to change code. Thus inspectors can be sure of consistence in operation of the chamber. The program is written in the Visual Basic 4 (MicroSoft Corp.) by Paul Winkelman and is completely menu driven and user friendly. The "INITIAL" display offers several options to the operator from a menu tool bar. A "CHECK" display presents a view of the immediate sensor temperature values. A "CALIBRATION" display offers the inspectors a procedure to calibrate the sensors which would be placed in a water bath of known temperature. The sensors can be automatically calibrated over a set time interval as a group or can be individually calibrated by the inspectors. The "START" display allows the entry of probed fruit weights and other pertinent data required to be part of the printed record of each run. The "RUN" screen follows the start menu and displays all the monitored information such as temperature of all fruit sensors, relative humidity, air temperatures both target and actual, elapsed, real and heating times. In addition, the state of all digital and analog output functions is displayed, such as the water mister for humidity control, the hot water pump speed, and underfloor cooling fan. The "RUN" display also displays the quarantine parameters and fruit type and the inspectors identification. The "RUN" display is updated every minute and the data filed onto a unique file on the hard disk. The relevant information is also printed out as hard copy for later inspection by inspectors. If the printer jams or runs out of paper the file can be retrieved and printed out a at a later time.

When quarantine has been achieved the computer will stop the fans and hot water pump and open the cool down valves. This point in the run is marked by a clear statement printed on the hard copy as "Commence HydroCool" and by a new display called the "HYDROCOOL" screen. There are a variety of choices available to the operator in the program but none which could affect the efficacy of the quarantine standards as set by the inspectors. Various other useful computer displays and functions are available and are described in detail in the Operations Manual supplied with each chamber.

OPERATING PROCEDURES FOR THE SECOND PREFERRED EMBODIMENT

1. Before the inspectors arrive:
   a. In the packing house.
      Fruit is graded and loaded into single layers in lugs. During this grading process at least twenty of the largest fruit are selected for the inspectors to use as probed fruit. All probed fruit must be significantly larger than any other fruit in the batch. The hot water heater has to be checked to see if the temperature and dynamic pressure in the system is within limits.
   b. In the computer room.
      The operator must determine that the computer is switched on and that the printer is switched on and has a proper supply of paper. The Omega control board must be on and the incoming power supply for the digital outputs in the "On" position.
   c. In the chamber.
      The operator should then check that the wet bulb sensor has its wick properly fitted and that the water bath is operating. The water misting system can be checked by using the digital switch on the computer to manually activate the spray which should be observed and then switched off. The interior lights should be on and the probe leads carefully removed from on top of the heat exchangers and placed on their hoods ready for the inspectors. Every probe should have its protective rubber sleeve in place at all times other than when inserted into the fruit.

2. The inspectors arrive and decide if any calibration is required. If not then the first pallet is placed next to the loading door and the inspectors select three fruit, probe these fruit and place them on the top layer in predetermined locations. The fruit weight of every probed fruit and its associated probe number are recorded for entry into the computer via the start screen.

3. The first pallet is lifted by the forklift and placed into the chamber on the support tracks. The second pallet is probed and placed on the tracks by pushing the first pallet ahead of it.

4. The operator climbs onto a small platform to monitor the probe leads as he activates the conveyor to push the first two pallets into the chamber across the heat exchanger and into position at the far end of the chamber. The limit switch will stop the pallet travel at the correct point. Great care must be taken to avoid damaging the probe wires and good interior lights are provided.

5. The third and fourth pallets are probed in a similar way and loaded into the chamber. The loading door is closed and locked by the inspectors.

6. The data about the probed fruit weights and inspectors name are entered into the computer and the run started. The operator then goes to the main electrical panel and ensures that the fans have automatically started and the hot water pump is running. This is achieved by checking the inverter displays. The operator should then return to the computer office and observe that the displays show the air temperature rising properly and all probes showing reasonable values.

7. During the run, regular visits to the chamber should be made by the operator to check the computer display and the inverter displays to ensure the run is proceeding normally.

8. The computer will turn off all chamber systems when hydrocooling is complete. The inspectors will have returned and will check the printed record of the run. If they are satisfied, they will sign off on the record and remove it from the printer. All run data records are recorded on disk and can be reproduced if required at any subsequent time. The inspectors are the only ones with keys to the chamber doors. They will proceed into the fly free zone to unlock the unloading doors.

9. The forklift driver will lift the first pallet from the chamber while the operator guides the probe leads to prevent damage. The inspector will remove the probes and replace the protective sleeve on each sensor probe. There is a hook to hang the first three sensor leads out of the way.

10. The second pallet is moved down the chamber with the conveyor by the operator ready for removal by the forklift. Once the probes are removed, the third pallet can be moved down the chamber. During this action, the first six sensors must be carefully moved by hand around the paddles as they proceed up to the ceiling and toward the loading end of the chamber as the chain rotates. The paddles should be moved into a convenient position and stopped. The sensor leads can be threaded around the paddles and returned to the hooks. It is dangerous to try to work around a moving conveyor.

11. The third and fourth pallets are removed in a similar manner and all twelve sensors should be sleeved for protection and placed gently on the heat exchanger in the center of the chamber. The unloading doors can be closed and will be locked by the inspectors.

The treatment cycle can be repeated for the next run.

EXPERIMENTAL

The following examples are provided in order to demonstrate and further illustrate certain aspects of the present invention. The examples are not to be construed as limiting the invention.

EXAMPLE 1

The following table is designed to show the difference in uniformity and temperature control between a treatment chamber of the prior art and one embodiment of the treatment chamber of the present invention. The differences in performance is illustrated in Table 1, which shows measured temperatures for a prior art chamber and for the present chamber during test runs. The prior art chamber includes the fan/heat exchanger assembly on the outside of the treatment chamber using a duct construction to blow the heated air into the treatment chamber. The bins in this chamber are stacked two high and the air flow is reversed every thirty minutes. The test on the prior art chamber was run on Jan. 7, 1993, until all of the monitored fruit had their fruit center temperatures raised to 47.2° C. When the last temperature probe, inside a fruit center, reached 47.2° C., the cooling water was turned on immediately and the temperatures of all the probes recorded. Thirty six probes were used to measure the temperature inside of the prior art chamber. These temperatures for the probes are listed in the table and the mean and standard deviation are included at the bottom of the table. The temperatures measured at the end of heating ranged from 47.6° C. to 49.3° C., with the mean temperature equal to 48.43° C., a range of temperatures from 47.63° C. to 49.32° C. and a variance in temperatures of 1.69° C.

One embodiment of the treatment chamber in the present invention was tested on Sep. 15, 1993 in exactly the same way as the prior art chamber was tested, except that forty probes were used to measure temperature. Once all of the temperature probes had reached the temperature of 47.2° C., the cooling water was turned on and

TABLE 1

| Probe # | Prior Art Chamber Tested 1/7/93 Temp. ° C. | Chamber of Present Invention Tested 9/15/93 Temp. ° C. |
| --- | --- | --- |
| 1 | 47.81 | 47.9 |
| 2 | 48.57 | 47.2 |
| 3 | 48.48 | 47.6 |
| 4 | 48.44 | 47.5 |
| 5 | 48.08 | 48.0 |
| 6 | 48.19 | 48.2 |
| 7 | 47.63 | 48.4 |
| 8 | 48.38 | 48.2 |
| 9 | 49.32 | 48.3 |
| 10 | 48.33 | 48.4 |
| 11 | 48.38 | 47.8 |
| 12 | 48.41 | 48.5 |
| 13 | 48.62 | 48.2 |
| 14 | 48.49 | 48.3 |
| 15 | 48.35 | 48.2 |
| 16 | 48.53 | 48.3 |
| 17 | 48.83 | 48.2 |
| 18 | 48.16 | 48.1 |
| 19 | 48.77 | 47.9 |
| 20 | 48.52 | 48.3 |
| 21 | 48.67 | 47.7 |

TABLE 1-continued

| Probe # | Prior Art Chamber Tested 1/7/93 Temp. ° C. | Chamber of Present Invention Tested 9/15/93 Temp. ° C. |
| --- | --- | --- |
| 22 | 48.47 | 47.9 |
| 23 | 48.41 | 47.9 |
| 24 | 48.51 | 48.0 |
| 25 | 48.75 | 48.0 |
| 26 | 48.36 | 48.3 |
| 27 | 49.16 | 47.8 |
| 28 | 48.08 | 47.6 |
| 29 | 48.44 | 48.0 |
| 30 | 48.23 | 47.6 |
| 31 | 48.42 | 47.9 |
| 32 | 48.12 | 47.7 |
| 33 | 48.29 | 48.0 |
| 34 | 48.55 | 48.2 |
| 35 | 48.24 | 47.9 |
| 36 | 48.52 | 48.7 |
| 37 |  | 48.4 |
| 38 |  | 48.3 |
| 39 |  | 48.5 |
| 40 |  | 48.5 |
| Mean: | 48.43 | 48.06 |
| Range: | 47.63–49.32 | 47.2–48.7 |
| Variance: | 1.69 | 1.5 | the temperatures of all the probes recorded. The temperatures of these probes are listed in a side-by-side comparison to the measurements taken in the test of the prior art chamber to illustrate the greater uniformity of the treatment chamber of the present invention to the chamber of the prior art. The temperatures in the test of the chamber of the present invention ranged from 47.2° C. to 48.7° C., with the mean temperature equal to 48.06° C., a range of temperatures from 47.2° C. to 48.7° C. and a variance in temperatures of 1.5° C. Thus, the temperature distribution of the probes in the chamber of the present invention was less likely to exceed the potential damage temperature to the extent that the probes of the prior art chamber did. In fact, only one probe exceeded the potential damage temperature of 48.5° C. in the test of the present invention. While there was only a difference of 0.37° C. between the mean values of the two tests, that difference is very great in the narrow temperature range within which the treatment chamber must be operated in.

It will be apparent to one of reasonable skill in the art that various modifications may be made to the preferred embodiments described above without departing from the spirit and scope of the invention as defined by the appended claims.

We claim:

1. A treatment system for disinfesting fruit or vegetables, comprising:

a. a treatment chamber;

b. a pallet of fruit or vegetables, said pallet comprising a metal deformable frame;

c. a conveyor track system configured for moving said pallet along the length of said chamber, said conveyor track system comprising first and second frictional sealing tracks, one on each side of the chamber, and a center roller track capable of supporting the center of said pallet, thereby causing deformation of said deformable pallet frame, the conveyor track positioned within said chamber.

2. The pest disinfestation system of claim 1, wherein said chamber further comprises a first set of end doors and a second set of end doors.

3. The pest disinfestation chamber of claim 1, wherein said first and second frictional sealing tracks comprise polyethylene.

4. A method of treating fruit or vegetables, comprising:
   a. providing: i) a pallet of fruit or vegetables, said pallet comprising a metal deformable frame; ii) a treatment chamber comprising means for heating and circulating air within the chamber and through said fruit or vegetables, and an internally positioned conveyor track system configured for moving said pallet along the length of said chamber and above said means for heating and circulating air, said conveyor track system comprising first and second frictional sealing tracks, one on each side of the chamber, and a center roller track capable of supporting the center of said pallet;
   b. introducing said pallet into said treatment chamber under conditions wherein said center roller track causes deformation of said deformable pallet frame; and
   c. subjecting said fruit or vegetables in said pallet to heated air from said means for heating and circulating air, thereby treating said fruit or vegetables.

5. The method of claim 4, wherein said chamber further comprises a first set of end doors and a second set of end doors.

6. The method of claim 4 wherein said means for heating and circulating air comprises a fan and heat exchanger.

7. A treatment system for disinfesting fruit or vegetables, comprising:
   a. a treatment chamber;
   b. a pallet of fruit or vegetables, said pallet comprising a metal deformable frame;
   c. a conveyor track system configured for moving said pallet along the length of said chamber, said conveyor track system comprising first and second frictional sealing tracks, one on each side of the chamber, wherein said first and second frictional sealing tracks comprise polyethylene, and a center roller track capable of supporting the center of said pallet, thereby causing deformation of said deformable pallet frame, the conveyor track positioned within said chamber.

* * * * *

UNITED STATES PATENT AND TRADEMARK OFFICE
CERTIFICATE OF CORRECTION

PATENT NO : 6,146,600
DATED : November 14, 2000
INVENTOR(S): Michael Ronald Williamson It is certified that error appears in the above-identified patent and that said Letters Patent is hereby corrected as shown below:

In the title (Page 1, Line 1):

Please delete "Side Body Disingestation Chamber"

and insert --Wide Body Disinfestation Chamber--.

Signed and Sealed this

First Day of May, 2001

Attest:

NICHOLAS P. GODICI

*Attesting Officer*   *Acting Director of the United States Patent and Trademark Office*